United States Patent
Saito

(10) Patent No.: US 6,313,956 B1
(45) Date of Patent: Nov. 6, 2001

(54) OPTICAL PICKUP APPARATUS AND OBJECTIVE LENS

(75) Inventor: Shinichiro Saito, Hachioji (JP)

(73) Assignee: Konica Corporation, Tokyo (JP)

(*) Notice: Subject to any disclaimer, the term of this patent is extended or adjusted under 35 U.S.C. 154(b) by 0 days.

(21) Appl. No.: 09/495,774

(22) Filed: Feb. 1, 2000

(30) Foreign Application Priority Data

Feb. 10, 1999 (JP) ................................................ 11-032501

(51) Int. Cl.⁷ ...................................................... G02B 3/10
(52) U.S. Cl. ......................... 359/721; 359/719; 369/25; 250/201.5
(58) Field of Search ..................................... 359/721, 719; 250/216, 201.5; 369/112.23, 112.25, 112.26, 53.22, 53.23

(56) References Cited

U.S. PATENT DOCUMENTS 5,777,803  *  7/1998  Ju et al. ............................... 359/719
6,124,988  *  9/2000  Yanagisawa et al. ................. 359/719

* cited by examiner

*Primary Examiner*—Georgia Epps
*Assistant Examiner*—Tim Thompson
(74) *Attorney, Agent, or Firm*—Finnegan, Henderson, Farabow, Garrett & Dunner, L.L.P.

(57) ABSTRACT

An optical pickup apparatus for reproducing information from or recording onto one of different kinds of optical information recording medium comprises a first light source for emitting first light flux whose wavelength is $\lambda 1$; a second light source for emitting second light flux whose wavelength is $\lambda 2$, wherein $\lambda 2$ is greater than $\lambda 1$; a converging optical system comprising an objective lens having an optical axis and divided three (first, second and third) portions; and a photo detector. The following conditional formula is satisfied for an amount of the first light flux not less than 30% of the total amount of the first light flux passing the first portion: $0.06 \geq SC1/f1 \geq 0.002$ where, in case that the first portion converges the first light flux on a first information recording plane, SC1 is a sine condition dissatisfaction amount of the first portion of the objective lens for a light flux at a height in the first light flux, and in case that the first portion converges the first light flux on a first information recording plane, f1 is a focal length of the first portion of the objective lens for a first light flux.

21 Claims, 18 Drawing Sheets

FIRST OPTICAL INFORMATION RECORDING MEDIUM

SECOND OPTICAL INFORMATION RECORDING MEDIUM

OPTICAL PICKUP APPARATUS AND OBJECTIVE LENS

BACKGROUND OF THE INVENTION

The present invention relates to an objective lens used in an optical pickup apparatus wherein a light flux emitted from a laser is converged by an objective lens on an information recording plane through a transparent substrate of an optical information recording medium, and thereby an optical information is recorded and/or reproduced, and to the optical pickup apparatus. In particular, the invention relates to an objective lens and an optical pickup apparatus wherein first optical information recording medium having a t1-thick transparent substrate and second optical information recording medium having a t2-thick transparent substrate are used as an optical information recording medium, and a first light source having a wavelength of $\lambda 1$ is used for recording/reproducing the first optical information recording medium and a second light source having a wavelength of $\lambda 2$ is used for recording/reproducing the second optical information recording medium.

In recent years, with the practical use of a red semiconductor laser of a short wavelength, development of a DVD (digital video disk or called also a digital versatile disk), which is a high-density optical information recording medium having a larger capacity but a size of the same degree as a CD (compact disk) which is a conventional optical information recording medium (also called an optical disk), has been promoted. In this DVD, the numerical aperture NA of the objective lens at the side of the optical disk is made to be 0.6 in the case where a short wavelength semiconductor laser of 635 nm is used. Further, a DVD has a track pitch of 0.74 μm and a minimum pit length of 0.4 μm, and is made to have a high density more than twice in comparison with a CD, which has a track pitch of 1.6 μm and a minimum pit length of 0.83 μm. Moreover, in addition to the above-mentioned CD and DVD, optical disks having various standards, for instance, such as a CD-R (a direct read after write, writing once compact disk), a CD-RW, a LD (laser disk), an MD (mini-disk), and an MO (magneto-optic disk) are merchandised and have come into general use. In Table 5, the thickness of the transparent substrate and the required numerical aperture of various optical disks are shown.

TABLE 5

| Optical disk | Thickness of transparent substrate (mm) | Required numerical aperture NA (wavelength of light source λ nm) |
|---|---|---|
| CD, CD-R (reproducing only) | 1.20 | 0.45 (λ = 780) |
| CD-R (recording, reproducing) | 1.20 | 0.50 (λ = 780) |
| LD | 1.20 | 0.50 (λ = 780) |
| MD | 1.20 | 0.45 (λ = 780) |
| MO (ISO 3.5 inch 230 MB) | 1.20 | 0.55 (λ = 780) |
| MO (ISO 3.5 inch 640 MB) | 1.20 | 0.55 (λ = 680) |
| DVD | 0.60 | 0.60 (λ = 635) |

Besides, with regard to the CD-R, it is necessary for the light source to have a wavelength $\lambda$=780 (nm), but for the other optical disks, a light source having a wavelength other than those noted in Table 5 can be used; in this case, the required numerical aperture NA should be varied in accordance with the wavelength $\lambda$ of the light source used. For example, in the case of a CD, the required numerical aperture is approximated by NA=$\lambda$ (μm)/1.73, and in the case of a DVD, it is approximated by NA=$\lambda$ (μm)/1.06.

Further, the numerical aperture as referred to in this specification (for example, referred to as NA1, NA2, NAL, NAH, NA3, NA4, etc. hereinafter) means the numerical aperture of the converging optical system as seen from the transparent substrate side.

As described in the above, it is now an age when various kinds of optical disks, which are different in the size, the thickness of the transparent substrate, the recording density, the wavelength used, and so forth, are available on the market, and optical pickup devices capable of being used for various kinds of optical disks are proposed.

As one of them, it has been proposed an optical pickup device which is equipped with converging optical systems corresponding to the different optical disks respectively, and the converging optical systems are switched over in accordance with the optical disk to be reproduced. However, in this optical pickup device, a plurality of converging optical systems is required and it brings not only a high cost but also the necessity of a driving mechanism for switching over the converging optical systems; accordingly, the device is not desirable because of the complexity and the requirement of the precision in switching over.

Therefore, various kinds of optical pickup devices which can reproduce a plurality of optical disks by using a single converging optical system are proposed.

The inventors have developed a special objective lens composed of a plurality of annular bands which are formed by dividing the whole surface into concentric circles, wherein each of the annular bands is corrected for the aberration within the diffraction limit with regard to each pertinent optical information recording medium by positively utilizing the spherical aberration produced owing to a plurality of light sources having different wavelength and/or the transparent substrates with different thickness of recording surface, and have previously proposed an optical pickup with a simplified structure using this objective lens (Japanese patent application H9-286954).

With the extension of CD-R (write-once compact disk) representing a programmable optical disk, an optical pickup apparatus is required to have interchangeability with the CD-R. Reflectance of the CD-R is lowered on the short wavelength side, and when the short wavelength red semiconductor laser is made to be a light source, necessary signals (reproduction signals, focus error signals, and tracking error signals) are not obtained. Therefore, a semiconductor laser having a wavelength of 780 nm is prepared for the CD-R, separately from the short wavelength semiconductor laser for DVD.

Further, in the recent years, there has been suggested a light source unit wherein these two semiconductor lasers mentioned above are unitized, for simplifying assembly of light source units and for improving work efficiency.

However, as will be explained in detail in an embodiment later referring to drawings, two semiconductor lasers are arranged side by side on mostly the same plane in a light source unit. Therefore, in the optical pickup apparatus employing the aforesaid light source unit, when the short wavelength semiconductor laser for DVD is set on the optical axis of a light converging optical system for recording/reproducing which is common to both light sources, the semiconductor laser for CD is out of the optical axis in the structure, and a light flux enters an objective lens obliquely.

Therefore, in the case of design wherein no sine condition dissatisfaction amount is generated for recording/ reproducing of DVD as shown in aberration diagrams in FIG. 8, there are caused the following discrepancies, which was noticed by the inventor of the invention. Namely, in the case of using CD, an image height is usually owned, and thereby coma is in the serious state as shown in FIG. 9. In the case of using this unitized light source, when the sine condition is optimized in DVD, deterioration of coma is caused by image height and deterioration of astigmatism is caused by oblique incidence when CD is used, which results in unstable recording/reproducing operations of CD.

In this case, the sine condition dissatisfaction amount of the optical system excluding spherical aberration is defined as follows;

$$SC = DK \cdot \cos(uk)/NAk - (1-m) \cdot f$$

$$Nak = \sin(uk')$$

wherein, m: lateral magnification of the optical system, f: focal length of the optical system, uk: angle made between an optical axis and a ray when the ray enters an optical system, uk': angle made between an optical axis and a ray when the ray emerges out of an optical system, and dk: height of a ray at the anterior principal point of an optical system.

Therefore, when using a unitized light source, the sine condition for recording/reproducing DVD used on an axis is not optimized, but it is necessary that sine condition dissatisfaction amount SC which is on the level not to affect the axial capacity for recording/reproducing DVD adversely is given in advance in the course of the optical design, and thereby off-axis capacity for recording/reproducing CD is corrected.

Further, separately from the foregoing, there is suggested an optical pickup apparatus for recording/reproducing optical information recording media each having a transparent substrate with a different thickness wherein lateral magnification of an objective lens m is made to be greater than 0 for correcting spherical aberration in recording/reproducing of CD. When an objective lens is shifted from an optical axis for the reason of tracking, there is caused coma undesirably even in this case as an influence that the sine condition is not satisfied in the case of using CD. FIG. 10 shows an aberration diagram in the case of optimized sine condition for the use of DVD, and FIG. 11 shows image height characteristics of an objective lens. FIG. 11 shows the structure wherein image height characteristics of coma in the case of using CD are easily deteriorated.

SUMMARY OF THE INVENTION

An object of the invention is to provide an objective lens and an optical pickup apparatus for recording/reproducing optical information recording media each having a transparent substrate with a different thickness, wherein axial characteristics of an optical information recording medium on one side and off-axis characteristics of an optical information recording medium on the other side are balanced.

The above object can be achieved by the following structures.

(1) An optical pickup apparatus for reproducing information from one of different kinds of optical information recording medium, each having a transparent substrate in different thickness, or for recording information onto one of said different kinds of optical information recording medium, comprising:

a first light source for emitting first light flux whose wavelength is 1;

a second light source for emitting second light flux whose wavelength is $\lambda 2$, wherein $\lambda 2$ is greater than $\lambda 1$;

a converging optical system comprising an objective lens having an optical axis, a first portion, a second portion, and a third portion, the third portion being farther from the optical axis than the first portion, the second portion being provided between the first portion and the second portion, and an Photo detector, wherein the first portion and the third portion are capable of converging the first light flux on a first information recording plane of a first optical information recording medium having a first transparent substrate of thickness t1 to reproduce information recorded in the first optical information recording medium or record information in the first optical information recording medium, wherein the first portion and the second portion are capable of converging the second light flux on a second information recording plane of a second optical information recording medium having a second transparent substrate of thickness t2 to reproduce information recorded in the second optical information recording medium or record information in the second optical information recording medium, wherein t2 is greater than t1, wherein the photo detector is capable of receiving tight flux reflected from the first information recording plane or the second information recording plane, and wherein the following conditional formula is satisfied for an amount of the first light flux not less than 30% of the total amount of the first light flux passing the first portion:

$$0.06 \geq SC1/f1 \geq 0.002$$

where, in case that the first portion converges the first light flux on a first information recording plane, SC1 is a sine condition dissatisfaction amount of the first portion of the objective lens for a light flux at a height in the first light flux, and in case that the first portion converges the first light flux on a first information recording plane, f1 is a focal length of the first portion of the objective lens for a light flux at a height in the first light flux. Incidentally, the term "an amount of the first light flux not less than 30% of the total amount of the first light flux passing the first portion" does no means "not less than 30% of an energy amount of the first light flux passing the first portion" and means "rays not less than 30% of the first light flux passing the first portion. The above rate can be judged from the aberration curve. Further, assuming that NA at the boundary between the first portion and the second portion is NAL, it may be preferable that a ray at 0.8NAL satisfies the following conditional formula: 0.06≧SC1/f1 0.002.

(2) The optical pickup apparatus described in (1), wherein, in case that the first portion and the third portion converge the first light flux on a first information recording plane, a lateral magnification of the objective lens is m1, and in case that the first portion and the second portion converge the second light flux on a second information recording plane, a lateral magnification of the objective lens is m2, the following conditional formula is satisfied:

$$m1 = m2$$

(3) The optical pickup apparatus described in (2), wherein the following formula is satisfied.

$m1=0$ (4) The optical pickup apparatus described in (1), wherein the first light source and the second light source are arranged side by side on the same plane.

(5) The optical pickup apparatus described in (2), wherein the first light source and the second light source are made in a single unit.

(6) The optical pickup apparatus described in (1), wherein, in case that the first portion and the third portion converge the first light flux on a first information recording plane, a lateral magnification of the objective lens is m1, and in case that the first portion and the second portion converge the second light flux on a second information recording plane, a lateral magnification of the objective tens is m2, the following conditional formula is satisfied:

$m1>m2$ (7) The optical pickup apparatus described in (6), wherein the following formula is satisfied for an amount of the second light flux not less than 30% of the total amount of the second light flux passing the first portion:

$0.06 \geq SC2/f2 \geq 0.002$ where, in case that the first portion converges the second light flux on a second information recording plane, SC2 is a sine condition dissatisfaction amount of the first portion of the objective lens for a second light flux being at a height in the second light flux, and in case that the first portion converges the second light flux on a second information recording plane, f2 is a focal length of the first portion of the objective lens for a light flux at a height in the second light flux.

(8) The optical pickup apparatus described in (6), wherein the following conditional formula is satisfied:

$m1=0$ (9) The optical pickup apparatus described in (1), wherein the following conditional formula is satisfied:

$NA1>NA2$ where NA1 is a required numerical aperture of the objective lens at an image side thereof for recording or reproducing the first optical information recording medium, and NA2 is a required numerical aperture of the objective lens at an image side thereof for recording or reproducing the second optical information recording medium.

(10) The optical pickup apparatus described in (9), wherein the first light source is provided on the optical axis of the objective lens.

(11) The optical pickup apparatus described in (9), wherein the following conditional formulas are satisfied:

$0.55 \text{ mm} < t1 < 0.65 \text{ mm}$ $1.1 \text{ mm} < t2 < 1.3 \text{ mm}$ $630 \text{ nm} < \lambda 1 < 670 \text{ nm}$ $760 \text{ nm} < \lambda 2 < 820 \text{ nm}$ $0.55 < NA1 < 0.65$ $0.40 < NA2 < 0.55$

(12) The optical pickup apparatus described in (1), wherein the second portion is in a shape of a ring representing a circle concentric with the optical axis.

(13) The optical pickup apparatus described in (1), wherein the objective lens comprises a step provided on a boundary between the first portion and the second portion or between the second portion and the third portion.

(14) The optical pickup apparatus described in (1), wherein the objective lens further comprises a fourth portion, and the fourth portion being farther from the optical axis than the third portion.

(15) The optical pickup apparatus described in (14), wherein the objective lens further comprises a fifth portion, and the fifth portion being farther from the optical axis than the fourth portion.

(16) The optical pickup apparatus described in (1), wherein the objective lens is made of plastic.

(17) The optical pickup apparatus described in (1), wherein the first portion and the third portion are capable of converging the first light flux on the first information recording plane so that wave front aberrations on the first information recording plane is not more than 0.07 λ1 rms.

(18) The optical pickup apparatus described in (1), wherein the first portion and the second portion are capable of converging the second light flux on the second information recording plane, so that wave front aberrations on the second information recording plane is not more than 0.07 λ2 rms.

Further, the above object may be achieved by the following structures.

An objective lens of the invention is one which converges, with a light-converging optical system composed of plural refracting surfaces, a light flux emitted from a light source on an information recording plane through a transparent substrate of the optical information recording medium and is used in an optical pickup apparatus having therein a first light source with wavelength λ1 for recording/reproducing a first optical information recording medium having transparent substrate with thickness t1 and a second light source with wavelength λ2 for recording/reproducing a second optical information recording medium having transparent substrate with thickness t2 (t1<t2), and it is characterized in that a lateral magnification of the individual objective lens satisfies m1=m2 when m1 represents a lateral magnification for recording/reproducing a first optical information recording medium and m2 represents a lateral magnification for recording/reproducing a second optical information recording medium, and plural divided surfaces each being in a form of a concentric circle on an optical axis are arranged on at least one side of the objective lens, and at least one of the divided surfaces satisfies the following conditions;

$$0.06 \geq SC1/f1 \geq 0.002 \qquad (1)$$

wherein,

SC1: sine condition dissatisfaction amount of the objective lens at thickness t1 of a transparent substrate f1: focal length of the objective lens at thickness t1 of a transparent substrate.

Lateral magnification m1 of the aforesaid objective lens itself can be zero.

An optical pickup apparatus of the invention converges, with a light-converging optical system composed of plural refracting surfaces, a light flux emitted from a light source on an information recording plane through a transparent substrate of the optical information recording medium and has therein a first light source with wavelength λ1 for recording/reproducing a first optical information recording medium having transparent substrate with thickness t1 and a second light source with wavelength λ2 for recording/reproducing a second optical information recording medium having transparent substrate with thickness t2 (t1<t2), and it is characterized in that a lateral magnification of an individual objective lens of the light-converging optical system satisfies m1=m2 when m1 represents a lateral magnification for recording/reproducing a first optical information recording medium and m2 represents a lateral magnification for recording/reproducing a second optical information recording medium, and plural divided surfaces each being in a form of a concentric circle on an optical axis are arranged on at least one side of the objective lens, and at least one of the divided surfaces satisfies the following conditions;

$$0.06 \geq SC1/f1 \geq 0.002$$

wherein,

SC1: sine condition dissatisfaction amount of the objective lens at thickness t1 of a transparent substrate f1: focal length of the objective lens at thickness t1 of a transparent substrate.

In this optical pickup apparatus, the light source and the second light source are unitized, and lateral magnification m1 of the aforesaid objective lens itself can be zero.

An objective lens which converges, with a light-converging optical system composed of plural refracting surfaces, a light flux emitted from a light source on an information recording plane through a transparent substrate of the optical information recording medium and is used in an optical pickup apparatus having therein a first light source with wavelength $\lambda 1$ for recording/reproducing a first optical information recording medium having transparent substrate with thickness t1 and a second light source with wavelength $\lambda 2$ for recording/reproducing a second optical information recording medium having transparent substrate with thickness t2 (t1<t2), is characterized in that a lateral magnification of the individual objective lens satisfies m2<m1 when m1 represents a lateral magnification for recording/reproducing a first optical information recording medium and m2 represents a lateral magnification for recording/reproducing a second optical information recording medium, and plural divided surfaces each being in a form of a concentric circle on an optical axis are arranged on at least one side of the objective lens, and at least one of the divided surfaces satisfies the following conditions;

$$0.06 \geq SC1/f1 \geq 0.002$$

wherein,

SC1: sine condition dissatisfaction amount of the objective lens at thickness t1 of a transparent substrate f1: focal length of the objective lens at thickness t1 of a transparent substrate.

Further, at least one of the divided surfaces satisfies the following conditions;

$$0.06 \geq SC2/f2 \geq 0$$

wherein,

SC2: sine condition dissatisfaction amount of the objective lens at thickness t2 of a transparent substrate f2: focal length of the objective lens at thickness t2 of a transparent substrate.

Lateral magnification m1 of the aforesaid objective lens itself can be zero.

An optical pickup apparatus which converges, with a light-converging optical system composed of plural refracting surfaces, a light flux emitted from a light source on an information recording plane through a transparent substrate of the optical information recording medium and has therein a first light source with wavelength $\lambda 1$ for recording/reproducing a first optical information recording medium having transparent substrate with thickness t1 and a second light source with wavelength $\lambda 2$ for recording/reproducing a second optical information recording medium having transparent substrate with thickness t2 (t1<t2), wherein a lateral magnification of an individual objective lens satisfies m2<m1 when m1 represents a lateral magnification for recording/reproducing a first optical information recording medium and m2 represents a lateral magnification for recording/reproducing a second optical information recording medium, and plural divided surfaces each being in a form of a concentric circle on an optical axis are arranged on at least one side of the objective lens, and at least one of the divided surfaces satisfies the following conditions;

$$0.06 \geq SC1/f1 > 0.002$$

wherein,

SC1: sine condition dissatisfaction amount of the objective lens at thickness t1 of a transparent substrate f1: focal length of the objective lens at thickness t1 of a transparent substrate.

In this case, at least one of the divided surfaces satisfies the following conditions;

$$0.06 \geq SC2/f2 > 0$$

wherein,

SC2: sine condition dissatisfaction amount of the objective lens at thickness t2 of a transparent substrate f2: focal length of the objective lens at thickness t2 of a transparent substrate.

Lateral magnification m1 of the aforesaid objective lens itself can be zero.

Incidentally, SC1 can be expressed as follows, concerning a light flux at a certain height among the first light flux passing through the first portion of an objective lens.

$$SC1 = (dk1 \cdot \cos(uk1)/Nak1) - (1-m1) \cdot f1$$

m1: Lateral magnification of a first portion of an objective lens in case that the first portion of the objective lens converges a first light flux on a first information recording plane f1: Focal length of a first portion of an objective lens in case that the first portion of the objective lens converges a first light flux on a first information recording plane uk1: Angle formed between an optical axis of an objective lens and a light flux at the aforesaid height among the first light flux entering the objective lens (for example, this angle is zero when the first light source is placed on an optical axis of the objective lens, and collimated light enters the objective lens)

uk'1: Angle formed between an optical axis of an objective lens and a light flux at the aforesaid height among the first light flux emerging from the objective lens dk1: Height of a light flux at the anterior principal point of an objective lens This sine condition dissatisfaction amount can be determined by design of an objective lens.

In the invention, $0.06 \geq SC1/f1 \geq 0.002$ is satisfied in 30% or more of an amount of light passing through the first portion. Further, it is preferable that a light flux passing through the vicinity of a boundary between the first portion and the second portion among the first light flux passing through the first portion satisfies $0.06 \geq SC1/f1 \geq 0.002$. It is further preferable that all of first light fluxes passing through the first portion satisfy $0.06 \geq SC1/f1 \geq 0.002$.

In the invention, it is preferable that a light source used for optical information recording medium having a large necessary numerical aperture among plural light sources is arranged on an optical axis of the objective lens. For example, when a light source for CD-R (necessary numerical aperture 0.45–0.50) and that for DVD (necessary numerical aperture 0.6) are used, it is preferable that the light source for DVD is arranged on the optical axis of the objective lens.

Incidentally, even if m1 is slightly deviated from m2, they can be regarded to satisfy m1=m2. The necessary numerical aperture is a numerical aperture of the objective lens on the image side which is necessary for recording or reproducing an optical information recording medium. Preferably, it is a prescribed numerical aperture prescribed by a standard in each optical information recording medium.

DETAILED DESCRIPTION OF THE PREFERRED EMBODIMENT

The invention will be explained as follows, referring to the diagrams. Though there are given DVD and CD as a preferable example in the following embodiment, the invention is not limited to those, and various recording media can be applied.

(First Embodiment)

Figure 1:
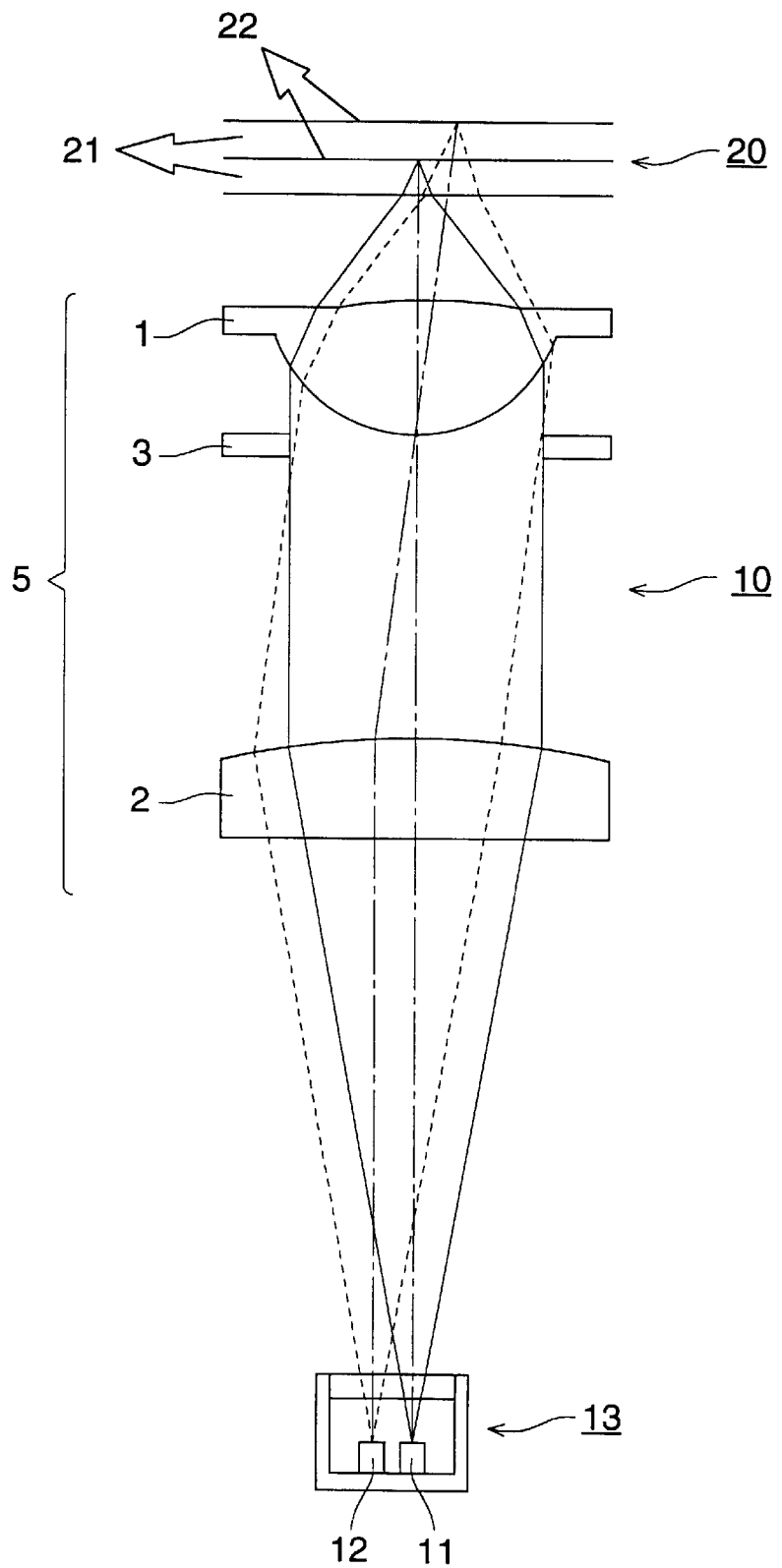
FIG. 1 is a schematic structure diagram of an embodiment of an optical pickup apparatus of the invention.

The first embodiment will be explained. FIG. 1 is a schematic structure diagram of optical pickup apparatus 10.

The optical pickup apparatus 10 of the present embodiment is one for recording/reproducing plural optical disks 20 each having transparent substrate 21 with a different thickness as optical disk 20 representing an optical information recording medium. These plural optical disks 20 will be explained as follows, as a first optical disk having a t1-thick transparent substrate and a second optical disk having a transparent substrate whose thickness is t2 which is different from t1. In the following explanation, DVD (including also DVD-RAM) means the first optical disk wherein thickness t1 of a transparent substrate is 0.6 mm, and CD (including also CD-R) means the second optical disk wherein thickness t2 is 1.2 mm.

The optical pickup apparatus 10 has therein light sources including first semiconductor laser 11 (wavelength λ 1=610 nm–670 nm) representing the first light source and second semiconductor laser 12 (wavelength λ2=740 nm–870 nm) representing the second light source. These first light source and second light source are used exclusively in accordance with an optical disk to be subjected to recording/reproducing.

In the present embodiment, the first semiconductor laser 11 and the second semiconductor laser 12 are unitized as unit 13. What is called "unit" or "unitization" in the invention means that unitized member and means can be incorporated in the optical pickup apparatus 10 as a unit, namely, they can be incorporated as a part when assembling an apparatus.

Light-converging optical system 5 is a means to converge a light flux emitted from the first semiconductor laser 11 or the second semiconductor laser 12 on each information recording surface 22 through transparent substrate 21 of optical disk 20 for forming a spot.

In the present embodiment, the light-converging optical system 5 has therein collimator lens 2 which transforms a light flux emitted from a light source to collimated light (mostly collimated) and objective lens 1 which converges a light flux made to be collimated light by the collimator lens 2.

Further, there is provided diaphragm 3 in an optical path. In the present embodiment, the diaphragm 3 has a fixed numerical number and requires no excessive mechanism, which makes it possible to realize low cost. Incidentally, for recording/reproducing the second optical disk, the numerical aperture of the diaphragm 3 may also be made variable, so that unwanted light may be eclipsed.

With regard to the lateral magnification of individual objective lens 1, m1 in the case of using DVD and m2 in the case of using CD satisfy the relationship of m1=m2. Incidentally, in the present embodiment, m1 does not need to be exactly the same as m2, and the condition of m1=m2 can be almost satisfied if the first semiconductor laser 11 and the second semiconductor laser 12 are unitized.

An unillustrated optical detection means is a means which receives and detects a light flux reflected on information recording surface 22, and a change in distribution of a quantity of light of a light flux reflected on the information recording surface is detected by the optical detection means, thus, focusing detection (focus error signals), track detection (tracking error signals) and information reading (reproduction signals) are conducted by an unillustrated operation circuit. Based on this detection, a two-dimensional actuator moves an objective lens so that light emitted from a light source may form an image on the information recording surface, and moves an objective lens so that light emitted from a light source may form an image on the prescribed track. Incidentally, for the focusing detection and track detection, it is possible to use various known methods such as an astigmatism method, a knife edge method, an SSD method, a phase difference detection method, a push-pull method and a three-beam method. When this optical detection means is unitized with unit 13, it is easy to assemble the apparatus, and low cost is realized.

On at least one side of objective lens 1, there are arranged plural divided surfaces each being in a form of a concentric circle whose center is optical axis 4. This arrangement is to make spherical aberrations caused by a difference of thickness t1 and thickness t2 of transparent substrate 21 of optical disk 20 to be compatible.

Figure 2:
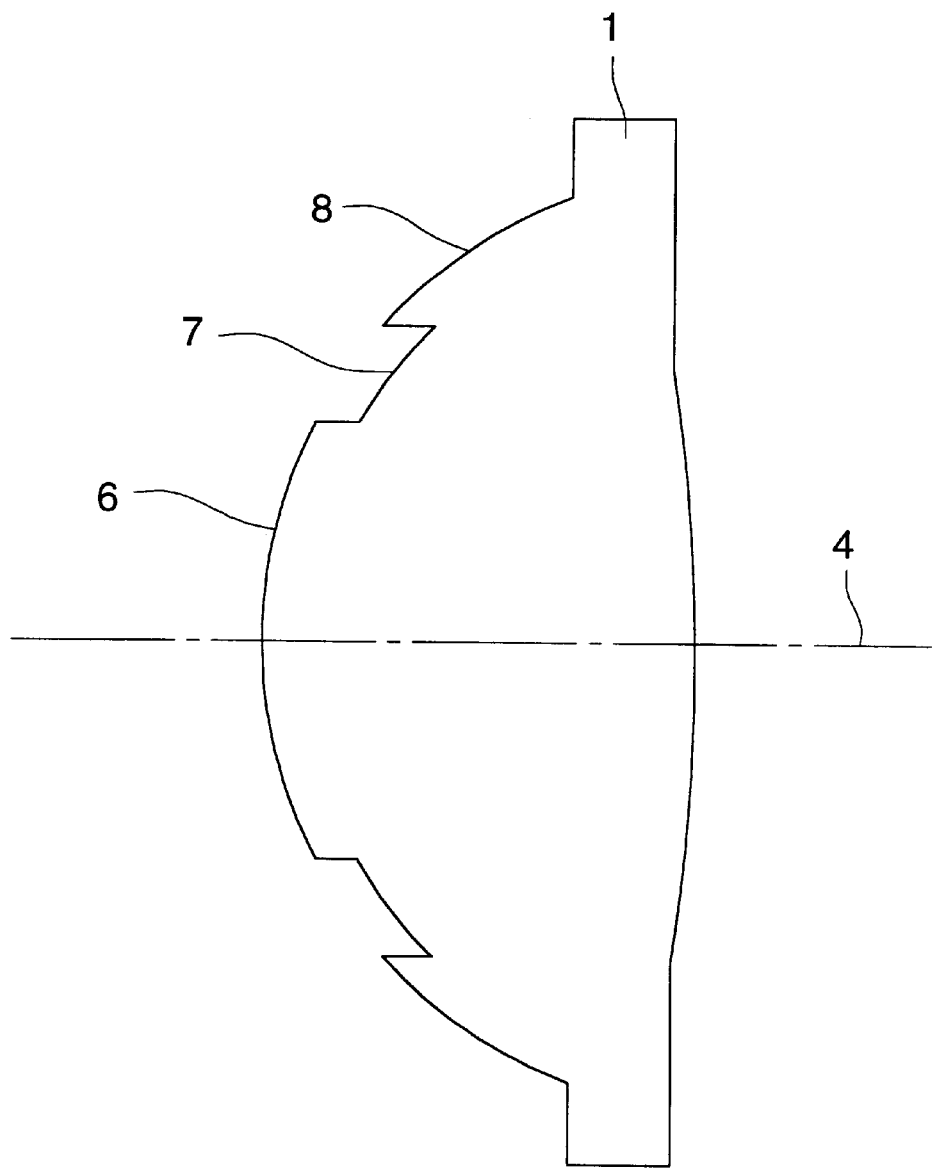
FIG. 2 is a schematic structure diagram showing an example of an embodiment of an objective lens for an optical pickup apparatus of the invention.

As shown in FIG. 2, the surface of objective lens 1 on the unit 13 side is made to be composed of first divided surface 6, second divided surface 7 and third divided surface 8 each being in a form of a concentric circle whose center is optical axis 4. The first divided surface 6 corrects spherical aberration for both occasions to use DVD and to use CD, the second divided surface 7 corrects spherical aberration for the use of CD and the third divided surface 8 corrects spherical aberration for the use of DVD.

As a result, when using DVD, light fluxes passing respectively through the first divided surface 6 and the third divided surface 8 form a spot light on information recording surface 22. The light flux which has passed the second divided surface 7 becomes a flare light passing through the outside of the spot on the information recording surface 22. The spot light realizes a spot size equivalent to NA 0,6 of the objective lens.

When CD is used, a light flux passing through first divided surface 6 and second divided surface 7 forms a spot light on information recording surface 22. A light flux passing through third divided surface 8 becomes a flare light passing through the outside of the spot light on the information recording surface 22. The spot light realizes a spot size equivalent to NA 0.45 of the objective light.

The flare light stated above is a discontinuous light where an amount of spherical aberration is different, and it passes the position which is away from a main spot light to have no influence on the spot light.

The first semiconductor laser 11 representing a light source for DVD is arranged on an optical axis of light-converging optical system 5, and the second semiconductor laser 12 representing a light source for CD is arranged to be off the optical axis accordingly. Therefore, when CD is used, a light flux usually enters objective lens 1 obliquely.

Therefore, when sine condition dissatisfaction amount SC1 of a light flux passing through the first divided surface 6 and the third divided surface 8 (same aspherical form as of the first divided surface in the present embodiment) in the case of using DVD satisfies the following relationship, $$0.06 \geq SC1/f1 \geq 0.002 \quad (1)$$

wherein, f1 is a focal length of objective lens 1 at thickness t1 of a transparent substrate, spot capacity for DVD using a position on the axis and spot capacity for CD using a position out of the axis (coma) can be compatible. This sine condition dissatisfaction amount SC1 takes a different value depending on an incident height of a ray entering objective lens 1. Though it is preferable that the aforesaid range is satisfied for all rays each having a different incident height, all rays entering the objective lens 1 do not necessarily need to satisfy the aforesaid range.

In the case of design of a sine condition dissatisfaction amount wherein many of rays entering the objective lens 1 exceed the upper limit, DVD capacity using a position on the axis is deteriorated. Further, when many of rays entering the objective lens 1 are lower than the lower limit, coma of CD using a position out of the axis can not be corrected.

Further, if collimated light is made to enter the objective lens 1 (m1=0), an influence of coma in the case of using DVD caused by tracking of the objective lens 1 can be made small. Now, light-receiving operations by an optical pickup apparatus and an objective lens will be explained in detail.

In the optical pickup device 10, when the first optical disk having the transparent substrate with the thickness ti, for example a DVD ($t_1$=0.6 mm, a refractive index of the transparent substrate is 1.58), is reproduced, the objective lens 1 is driven by the two-dimensional actuator in such a way as to form the minimum circle of confusion (best focusing). When the second optical disk having the substrate with the thickness $t_2$, which is different from $t_1$ ($t_2$>$t_1$), and a recording density lower than that of the first optical disk, for example a CD ($t_2$=1.2 mm, a refractive index of the transparent substrate is 1.58) is reproduced by using this objective lens 1, spherical aberration is produced owing to the difference in the thickness (becoming larger thickness) of the transparent substrate; accordingly, at the position where the beam spot becomes the minimum circle of confusion (the rearward position farther than the near-axis image forming position), the spot size is not small enough to read (reproduce) the pits (information) of the second optical disk. However, at the forward position (forward focusing) which is nearer to the objective lens 1 than this position of the minimum circle of confusion, the size of the spot as a whole is larger than the minimum circle of confusion, but the spot is formed of a nucleus, in the central portion of which luminous flux is concentrated, and a flare portion around the nucleus, which is unnecessary light. By utilizing this nucleus for reproducing (reading) the pits (information) of the second optical disk, at the time of reproducing the second disk, the two-dimensional actuator is driven in a way such that the objective lens 1 is brought into a defocused state (forward focusing).

Figure 12:
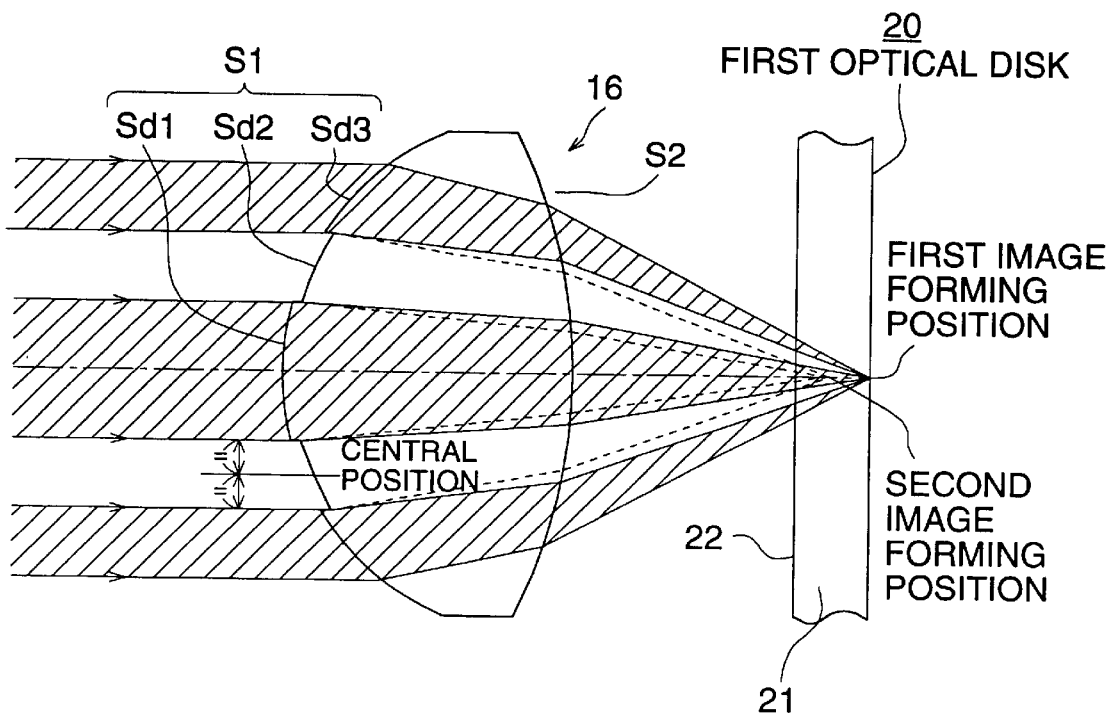
FIG. 12(a) is a cross-sectional view showing an objective lens schematically.
FIG. 12(b) is a front view of the objective lens viewing from a light source side.
Figure 12:
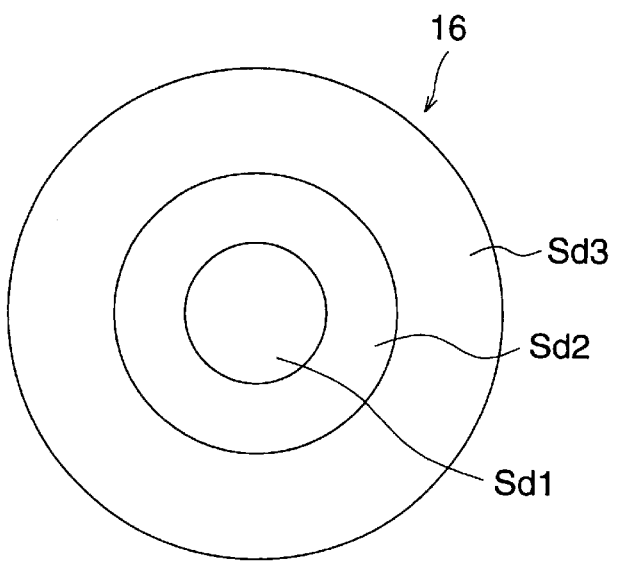

In the following, it will be explained the embodiment wherein this invention is applied to the objective lens 1, which is one optical element of the converging optical system of the optical pickup device 10, in order to reproduce the first optical disk and the second optical disk, both having the substrate with different thickness, by a single converging optical system. FIG. 12 is a cross-sectional view showing the objective lens schematically (a), and the front view of it seen from the light source side (b). In addition, the single dot and a dash line indicates the optical axis. Further, in this embodiment, the thickness of the transparent substrate of the first optical disk t1 is thinner than the thickness of the transparent substrate of the second optical disk $t_2$, and information is recorded at higher density in the first optical disk than in the second optical disk.

In this embodiment of the invention, the objective lens 1 is a convex lens having the refracting surface S1 facing toward the light source and the refracting surface S2 facing toward the optical disk, both of which have a shape of an aspherical face and a positive refracting power. Further, the refracting surface of the objective lens 1 facing toward the light source S1 is composed of a plurality (three in this embodiment) of concentric divided surfaces, namely, the first divided surface Sd1– the third divided surface Sd3. At each of the borders of the divided surfaces Sd1–Sd3, a step is provided to form the respective divided surfaces Sd1–Sd3. This objective lens 1 has a structure such that the light flux passing through the first divided surface Sd1 including the optical axis (the first light flux) is utilized for reproducing the information recorded in the first optical disk and in the second optical disk, and the light flux passing through the second divided surface Sd2 which is farther from the optical axis than the first divided surface Sd1 (the second light flux) is utilized mainly for reproducing the information recorded in the second optical disk, and the light flux passing through the third divided surface Sd3 which is farther from the optical axis than the second divided surface Sd2 (the third light flux) is utilized mainly for reproducing the information recorded in the first optical disk.

In the above description, the word "mainly" means that, in the case of the light flux passing through the second divided surface Sd2, the ratio of the energy of the nucleus portion at the position where the central intensity of the beam spot becomes maximum on the condition that the light flux passing through the third divided surface Sd3 is intercepted, to the energy of the nucleus portion at the position where the central intensity of the beam spot becomes maximum on the condition that the light flux passing through the third divided surface Sd3 is not intercepted ("nucleus energy in the light shielding state"/ "nucleus energy in the no light shielding state") falls within the range of 60% to 100%. Further, also in the case of the light flux passing through the third divided surface Sd3, it means that the ratio of the energy of the nucleus portion in the state of light shielding to the energy of the nucleus in the state of no light shielding ("nucleus energy in the light shielding state"/"nucleus energy in the no light shielding state") falls within the range of 60% to 100%. In addition, in order to measure this energy ratio simply, in the respective cases, it is proper simply to measure the peak intensity in the beam spot Ip and the beam diameter Dp (defined by the position where the intensity becomes $e^{-2}$ to the central intensity) at the position where its central intensity becomes maximum, to obtain the product Ip×Dp for the reason that the shape of the beam is approximately constant, and to compare the results.

As described in the above, by utilizing the first light flux in the neighborhood of the optical axis of the converging optical system for the reproduction of the first disk and the second disk, the second light flux which is farther from the optical axis than the first light flux mainly for the reproduction of the second optical disk, and the third light flux which is farther from the optical axis than the second light flux mainly for the reproduction of the first optical disk, it becomes possible to reproduce a plurality (two in this embodiment) of optical disks by a single converging optical system, while the loss of the light quantity from the light source is suppressed. On top of that, most part of the third light flux is unnecessary at the time of reproducing the second optical disk in this case, but this unnecessary light is not utilized for the reproduction of the second optical disk; hence, the reproduction can be performed only by making the stop be at the numerical aperture to be required for the reproduction of the first optical disk, with no means for changing the numerical aperture of the stop needed.

To state it more in detail with reference to FIG. 12, the objective lens 1 in this embodiment converges the first light flux and the third light flux which pass through the first divided surface Sd1 and the third divided surface Sd3 respectively (light flux shown by the oblique lines) on approximately the same positions, one of which is a first image forming position, and the wave front aberration (wave front aberration with the second light flux passing through the second divided surface Sd2 excluded) is not larger than $0.07\lambda_1$ rms. Desirably, it should be not larger than $0.05\lambda_1$ rms. Here, $\lambda_1$ is the wavelength of the light source.

Further, at this time, the second light flux passing through the second divided surface Sd2 (light flux shown by the broken lines) converges on the second image forming position which is different from the first image forming position. Supposing that the first image forming position is at zero, the objective lens side of it is negative, and its reverse side is positive, this second image forming position should be at a distance from −40 μm to −4 μm, or desirably from −27 μm to −4 μm from the first image forming position (the second image forming position is made to be closer to the objective lens than the first image forming position). Owing to this, the reproduction of the first optical disk is carried out mainly by the first light flux and the third light flux. Further, if the distance exceeds this lower limit (−40 μm), the spherical aberration is corrected in excess, and the spot shape at the time of reproducing the first optical disk becomes bad; if the distance exceeds the upper limit (−4 μm), the spot diameter and the side lobe becomes large at the time of reproducing the second optical disk. Furthermore, in this embodiment, because t1<t2 and NA1>NA2, the second image forming position is made to be at a distance from −40 μm to −4 μm, or desirably from −27 μm to −4 μm from the first image forming position; however, in the case where t1>t2 and NA1>NA2, the second image forming position should be at a distance from 4 μm to 40 μm, or desirably from 4 μm to 27 μm from the first image forming position. That is, the absolute value of the distance between the first image forming position and the second image forming position should be within the range of 4 μm to 40 μm, or desirably 4 μm to 27 μm.

Figure 13:
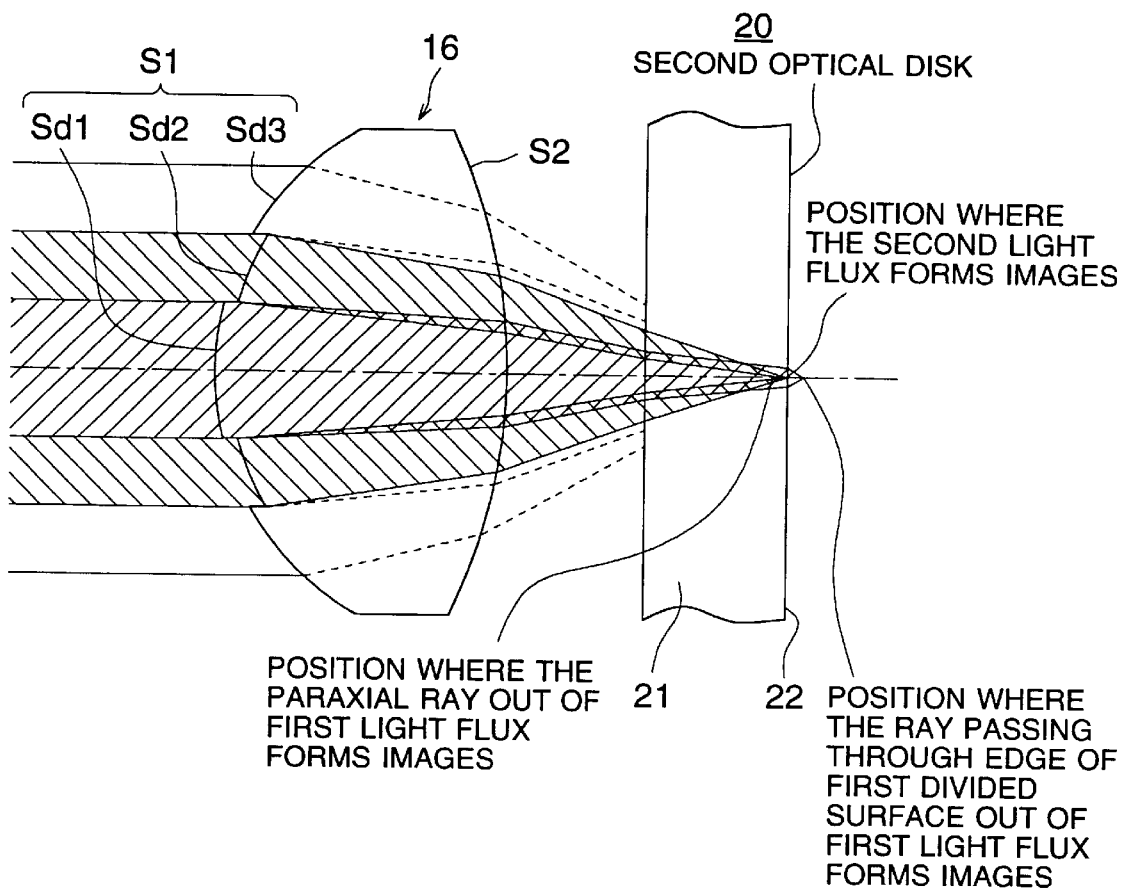
FIG. 13 is a cross-sectional view showing an objective lens schematically.

Further, when the above-mentioned objective lens 1 is used for reproduction of the second optical disk having the transparent substrate with the predetermined thickness (t2= 1.2 mm), as shown in FIG. 13, in the case of the predetermined light flux (parallel light flux) incident on the objective lens 1, the rays of the second light flux (shown by the oblique lines drawn from upper left to lower right) intersect the optical axis (forming an image) at the position between the position where the rays passing through the neighborhood of the optical axis among the first light flux (shown by the oblique lines drawn from lower left to upper right) intersect the optical axis, and the position where the rays passing through the edge portion of the first divided surface Sd1 (border to the second divided surface Sd2) intersect the optical axis. Therefore, the first light flux and the second light flux converge in the close vicinity of the information recording plane of the second optical disk, and the reproduction of the second optical disk is carried out. At this time, the third light flux (shown by the broken lines halfway) is generated as a flare, but the reproduction of the second optical disk is possible by the nuclei formed by the first light flux and the second light flux.

In other words, in this invention, the first light flux with small numerical aperture passing through the neighborhood of the optical axis is utilized for all the optical disks that can be reproduced; further, the light flux passing through the farther zone from the optical axis than the first divided surface is divided in such a manner as to correspond to each of the optical disks to be reproduced, and the respective light flux formed by dividing are utilized for the reproduction of the respective optical disks (the first and second optical disks in this embodiment). At this time, the light flux utilized for the reproduction of the optical disk requiring the larger numerical aperture for the reproduction of the information recorded in the optical disk (the first optical disk in this embodiment) should be the one that is apart from the first light flux (the third light flux in this embodiment) out of the light flux formed by dividing.

By using such a converging optical system (the objective lens 1 in this embodiment), it is possible to reproduce a plurality of optical disks having the transparent substrate with different thicknesses by a single converging optical system; further, because the recording plane can be set arbitrarily, the numerical aperture required for the reproduction of the second optical disk NA2 can be made large. Moreover, by utilizing the light flux in the neighborhood of the optical axis (the first light flux) for the reproduction of a plurality of optical disks, the loss of light quantity of the light flux from the light source is reduced. On top of that, at the time of reproducing the second optical disk, the side lobe of the beam spot is decreased to form a nucleus with strong beam intensity; thus, a precise information can be obtained. Furthermore, a plurality of optical disks can be reproduced by a single converging optical system with no special means for changing the numerical aperture of the stop required.

Further, in this embodiment, with regard to the central position of the second divided surface Sd2 in the direction perpendicular to the optical axis (refer to FIG. 12($a$)), the angle between the normal line to the second divided surface Sd2 which is the surface from the numerical aperture NAL to the numerical aperture NAH and the optical axis should be larger than the angle between the normal line to the surface interpolated from the first divided surface Sd1 which is the surface from the optical axis to the numerical aperture NAL and the third divided surface Sd3 which is the surface from the numerical aperture NAH to the numerical aperture NA1 (an aspherical surface obtained from fitting by least square method using the equation of the aspherical surface expressed as the equation (1) to be described later) and the optical axis. Owing to this, it is possible to reproduce satisfactorily both of the first optical disk and the second optical disk. In addition, in this embodiment, because t2>t1 and NA1>NA2, the angle between the normal line to the second divided surface Sd2 and the optical axis should be larger than the angle between the normal line to the surface interpolated from the first divided surface Sd1 and the third divided surface Sd3 and the optical axis, but in the case where t2<t1 and NA1>NA2, it is proper to make it smaller.

Further, in this embodiment of the invention, it is desirable that the first divided surface Sd1– the third divided surface Sd3 are determined in a manner such that, with regard to the approximately central position of the second divided surface Sd2 in the direction perpendicular to the optical axis (refer to FIG. 12($a$)), the difference between the angle made by the normal line to the second divided surface Sd2 and the optical axis and the angle made by the normal line to the surface interpolated from the first divided surface Sd1 and the third divided surface Sd3 (an aspherical surface obtained from fitting by least square method using the equation of the aspherical surface expressed as the equation (1) to be described later) and the optical axis falls within the range of 0.02° to 1.0°. If the difference exceeds this lower limit, the spot shape at the time of reproducing the second optical disk becomes worse, and the side lobe spot diameter becomes larger; if the difference exceeds the upper limit, the spherical aberration is corrected in excess, and the spot shape at the time of reproducing the first optical disk becomes worse.

Further, to grasp this embodiment of the invention from another point of view, in the objective lens 1 having a plurality of divided surfaces (three divided surfaces in this embodiment) formed by dividing at least one of its surfaces by concentric circles with regard to the optical axis, on the condition that the light which has passed through the first divided surface Sd1 which is nearer to the optical axis than the second divided surface Sd2, and the light which has passed through the third divided surface Sd3 which is positioned at the reverse side of the second divided surface Sd2 against the optical axis are let to have approximately the same phase, through the transparent substrate with the predetermined thickness (the first optical disk), and let the phase difference between the light which has passed through the first divided surface Sd1 and the transparent substrate and the light which has passed through the portion of the second divided surface Sd2 which is to the optical axis side of the approximately central position of the second divided surface Sd2 in the direction perpendicular to the optical axis (refer to FIG. 12($a$)) be $(\Delta 1L)\pi$ (rad), and the phase difference between the light which has passed through the third divided surface Sd3 and the transparent substrate and the light which has passed through the portion of the second divided surface Sd2 which is to the reverse side of the above-mentioned central position against the optical axis and the transparent substrate be $(\Delta 1H)\pi$ (rad), then following inequality $(\Delta 1H)>(\Delta 1L)$ is established. In this case, the sign of the phase difference is let to be positive for the direction of progressing of the light (the direction to the optical disk), and the phase differences for the light which has passed through the second divided surface Sd2 and the transparent substrate against the light which has passed through the first divided surface Sd1 or the third divided surface Sd3 and through the transparent substrate are compared. Further, in this embodiment, because t1<t2 and NA1>NA2, the inequality $(\Delta 1H)>(\Delta 1L)$ should be established, but in the case where t1>t2 and NA1>NA2, the inequality $(\Delta 1H)<(\Delta 1L)$ should be established; accordingly $(\Delta 1H)\neq(\Delta 1L)$.

To state this from another point of view, the difference in surface level from the third divided surface Sd3 at the border of the third divided surface Sd3 and the second divided surface Sd2 is larger than the difference in surface level from the first divided surface Sd1 at the border of the first divided surface Sd1 and the second divided surface Sd2 (The sign of the difference in surface level is let to be positive to the direction in which the refractive index varies from a smaller value to a larger value at the refracting surface as the border. Further, hereinafter, the sign of the difference of surface level will be determined in the same way.) In the same way as the above-described, also in this case, in the case where t1>t2 and NA1>NA2, the above-mentioned relationship is reversed, that is, the difference in surface level of the second divided surface Sd2 from the third divided surface Sd3 is smaller than the difference in surface level of the second divided surface Sd2 from the first divided surface Sd1. Further, it is desirable that, if the difference between the position of the surface interpolated from the first divided surface and the third divided surface and the position of the second divided surface sd2 is taken with regard to an arbitrary position from the optical axis, it varies asymmetrically with regard to the approximately central position of the second divided surface sd2. Furthermore, in this case, it is desirable that the difference becomes larger with the distance from the optical axis.

In addition, in this embodiment of the invention, the divided surfaces Sd1–Sd3 are provided on the refracting surface S1 of the objective lens 1 facing the light source S1, but it is proper to provide them on the refracting surface facing toward the optical disk 20, or it may be appropriate to let any one of the optical elements of the converging optical system (such as a collimator lens 13, for example) have such a function; further, it may be proper to provide a new optical element having such a function on the optical path. Besides, it may be appropriate to provide the functions of the respective divided surfaces Sd1–Sd3 separately in the different optical elements.

Further, in this embodiment, it is employed the objective lens which is a lens of what is called an infinite system using a collimator lens 13; however, it is possible that an objective lens into which a divergent light flux from the light source enters directly without the collimator lens 13 or through a lens reducing the degree of divergence of the divergent light flux, or an objective lens into which the convergent light flux formed by using a coupling lens which converts a light flux from the light source into a convergent light flux is employed.

Further, in this embodiment, a step portion, that is, a difference in surface level is provided between each of the borders of the first divided surface Sd1– the third divided surface Sd3; however, it is possible to form the divided surface with at least one of the borders formed continuously without providing the step. In other case, it is possible that the border between the divided surfaces are joined, for example, by a surface with a predetermined radius of curvature without bending the border surface. This curvature may be the one that is provided intentionally or unintentionally. An example of this unintentionally provided curvature is the curvature at the border formed in processing the metallic mold for forming the objective lens 1 with a plastic material etc.

Further, in this embodiment, the refracting surface S1 is composed of the three divided surfaces Sd1–Sd3, but it should be composed of at least three or more divided surfaces, the number of divided surfaces being not limited to three. In this case, it is desirable that the first divided surface, which is utilized for the reproduction of the first optical disk and the second optical disk, is provided in the neighborhood of the optical axis, and regarding the divided surfaces which are positioned at outer part (the direction farther from the optical axis) of this first divided surface, the divided surfaces to be utilized mainly for the reproduction of the second optical disk and the divided surfaces to be utilized mainly for the reproduction of the first optical disk are provided alternately. Further, in this case, the divided surfaces which are utilized mainly for the reproduction of the second optical disk should desirably be provided between the numerical aperture NA3 and the numerical aperture NA4 on the optical disk side of the objective lens 1, the apertures NA3 and NA4 satisfying the conditions 0.60 (NA2)<NA3<1.3 (NA2) and 0.01<NA4−NA3<0.12. Owing to this, for the second optical disk, an optical disk requiring a larger numerical aperture can be reproduced, without decreasing the intensity of the light spot to be converged on the first optical disk. Furthermore, it is desirable in practical use that the upper limit of NA3 satisfies the inequality NA3<1.1 (NA2), and it is desirable that the lower limit of NA3 satisfies the inequality 0.80 (NA2)<NA3, further in practical use, 0.85 (NA2) <NA3. Further, it is desirable that the upper limit of NA4−NA3 satisfies the inequality NA4−NA3<0.1.

Further, in this embodiment, on the refracting surface of the objective lens 1 facing toward the light source, the second divided surface Sd2 is provided in a ring shape formed by concentric circles with regard to the optical axis; however, the shape is not limited to a ring, but may be a broken ring. Further, the second divided surface Sd2 may be made up of a hologram or a Fresnel lens. In addition, in the case where the second divided surface Sd2 is made up of a hologram, one of the light flux formed by dividing the original light flux into the zeroth order light and the first order light is utilized for the reproduction of the first optical disk and the other is utilized for the reproduction of the second optical disk. At this time, it is desirable that the light quantity of the light flux utilized for the second optical disk is larger than the light quantity of the light flux utilized for the reproduction of the first optical disk.

Further, in this embodiment, the reproduced signal from the second optical disk is made satisfactory by it that not only the condition that, when the first optical disk is reproduced (that is, when the light passes through the transparent substrate with the thickness t1), the best wave front aberration by the light flux passing through the first divided surface Sd1 and that passing through the third divided surface Sd3 is 0.07 $\lambda_1$ rms or desirably 0.05 $\lambda_1$ rms (where $\lambda_1$ (nm) is the wavelength of the light source used at the time of reproducing the first optical disk), but also the condition that, when the second optical disk is reproduced (that is, when the light passes through the transparent substrate with the thickness t2), the best wave front aberration by the light flux passing through the first divided surface Sd1 is 0.07$\lambda_2$ rms or desirably 0.05$\lambda_2$ rms (where $\lambda_2$ (nm) is the wavelength of the light source used at the time of reproducing the second optical disk) is satisfied.

Figure 14:
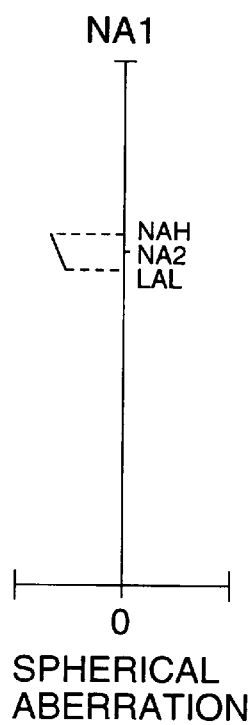
FIGS. 14(a) to 14(f) are diagrams showing lens characteristics.
Figure 14:
Figure 14:
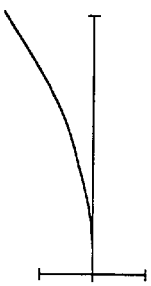
Figure 14:
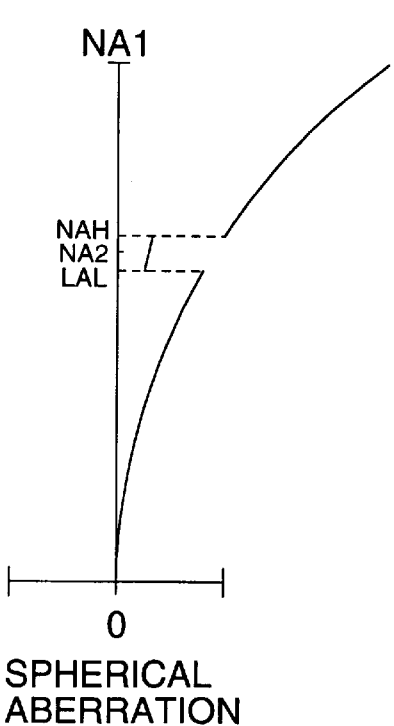
Figure 14:
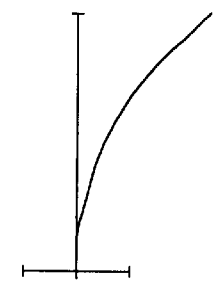
Figure 14:
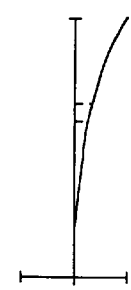

In the following, from another point of view, the explanation will be given with reference to FIG. 14 which is a drawing showing the spherical aberration of the objective lens 1. In FIG. 14, (a) is a drawing of the spherical aberration when the first optical disk is reproduced, that is, when reproduction is carried out through the transparent substrate with the thickness t1, and (b) is a drawing of the spherical aberration when the second optical disk is reproduced, that is, when the reproduction is carried out through the transparent substrate with the thickness t2 (t2>t1 in this embodiment). Now, let NA1 be the numerical aperture of the converging optical system at the optical disk side required for the reproduction of the information in the first optical disk, NA2 be the numerical aperture of the converging optical system at the optical disk side required for the reproduction of the information in the second optical disk (where NA2>NA1), NAL be the numerical aperture at the optical disk side of the light flux passing through the border between the divided surfaces Sd1 and Sd2 of the objective lens 1, and NAH be the numerical aperture at the optical disk side of the light flux passing through the border between the divided surfaces Sd2 and Sd3 of the objective lens 1.

Regarding the objective lens 1, first, the first aspherical surface of the first refracting surface S1 and the second refracting surface S2 (common refracting surface) are designed in such a manner as to make the best wave front aberration of the light flux converged on the first optical disk having the transparent substrate with the thickness t1 equal to or less than 0.07$\lambda_1$ rms or desirably 0.05$\lambda_1$ rms. FIG. 14(c) is the drawing of the spherical aberration obtained by this design. Further, the second aspherical surface of the first refracting surface S1 is designed with the second refraction surface S2 (common refracting surface) left as it is in such a manner as to make the spherical aberration less than the spherical aberration (FIG. 14(e), t2>t1 in this case) produced when the light flux is converged on the second optical disk having the transparent substrate with the thickness t2 (t2≠t1) through the lens having this first aspherical surface. At this time, it is favorable to make the paraxial radius of curvature of the second aspherical surface and the paraxial radius of curvature of the first aspherical surface the same for the purpose of making a good reproduction of the second optical disk which is subjected to reproduction in the defocused state. The graph of the spherical aberration of the lens obtained by this design at the time when the light flux is converged on the second optical disk is shown in FIG. 14(f), and the graph of the aberration at the time when the light flux is converged on the first optical disk by this lens is shown in FIG. 14(d). Then, the second aspherical surface is combined in the neighborhood of the numerical aperture of the first aspherical surface NA2 required for the second optical disk. In the above, it is desirable that the neighborhood of the required numerical aperture NA2 where the second aspherical surface is combined is between the numerical aperture NA3 and the numerical aperture NA4 of the objective lens 1 at the optical disk side, which satisfy not only the condition 0.60(NA2)<1.3 (NA2) (This lower limit 0.60(NA2) should desirably be 0.80(NA2) in practical use or more desirably 0.85(NA2), and this upper limit 1.3(NA2) should desirably be 1.1(NA2) in practical use.) but also the condition 0.01<NA4−NA3<0.12 (desirably 0.1). In this combined second aspherical surface (second divided surface), the edge near the optical axis is let to have the numerical aperture NAL and the farther edge from the optical axis is let to have the numerical aperture NAH (that is, NAL<NAH).

Accordingly, regarding the shape of the surface in the refracting surface S1 of the objective lens 1, the first divided surface Sd1 including the optical axis and the third divided surface Sd3 which is positioned farther from the optical axis than the first divided surface Sd1 have the same aspherical shape (the first aspherical surface), and the second divided surface which is positioned between the first divided surface Sd1 and the third divided surface Sd3 (in the neighborhood of the numerical aperture NA2 required for the reproduction of the second optical disk, that is, from NAL to NAH) has a different aspherical shape from the first divided surface Sd1 and the third divided surface Sd3 (the second aspherical surface). The obtained lens is the objective lens 1 of this embodiment of the invention; the graph of the spherical aberration at the time when the light flux is converged on the first optical disk by using this objective lens 1 is shown in FIG. 14(a), and the graph of the spherical aberration at the time when the light flux is converged on the second optical disk by using this objective lens 1 is shown in FIG. 14(b).

Moreover, it is possible to make it larger the light quantity of the converged light flux at the time of reproducing the first optical disk, by utilizing the phase difference produced by combining the first divided surface and the second divided surface, with the second divided surface Sd2 a little shifted in the direction of the optical axis when they are combined.

In this embodiment of the invention, the equation of the aspherical surface is based upon the following expression:

$$X = (H^2/r) \Big/ \left[1 + \sqrt{1-(1+K)(H/r)^2}\right] + \sum_j A_j H^{P_j}$$

where X is an axis in the direction of the optical axis and H is an axis in the direction perpendicular to the optical axis, with the direction of the progressing of light made positive, r is the radius of curvature in the neighborhood of the optical axis, K is the cone coefficient, Aj is the aspherical coefficient, and Pj is the number of the power of the aspherical surface (where $P_j \geq 3$). Further, in this invention, an equation of the spherical surface other than the above-described one may be used. In obtaining the equation of the spherical surface from the shape of the aspherical surface, Pj is substituted by a natural number as $3 \geq P_j \geq 1$, and K is substituted by zero as K=0 in the above equation.

As described in the above, the objective lens 1 obtained in this embodiment has a structure such that the spherical aberration varies discontinuously at at least two numerical aperture positions (NAL and NAH) in the neighborhood of the numerical aperture NA2, in order that a plurality of optical disks having the transparent substrate with different thicknesses may be reproduced by a single converging optical system. Because the lens is made to have a structure such that the spherical aberration varies discontinuously as described in the above, the light flux (in this embodiment, the first light flux–the third light flux) passing through the respective ranges of the numerical apertures (in this embodiment, the first divided surface from the optical axis to NAL, the second divided surface from NAL to NAH, and the third divided surface from NAH to NA1) can be made up arbitrarily; hence, it becomes possible that the first light flux is utilized for the reproduction of all the optical disks to be reproduced, and the second light flux and the third light flux are utilized for the predetermined optical disk out of the plural optical disks respectively, and a plurality of optical disks can be reproduced by a single converging optical system (the objective lens 1 in this embodiment); thus the optical pick up can be actualized at a low cost and without a complex structure, and further, it can cope with an optical disk requiring a high numerical aperture. On top of that, the stop is provided in such a manner as to correspond to only NA1, which is the highest numerical aperture, and any means for varying the stop is needed even if the numerical aperture required for the reproduction of the optical disk varies (to NA1 or to NA2). In addition, the sentence "the spherical aberration varies discontinuously" in this invention means that an abrupt variation is observed as seen in the graph of the spherical aberration.

Further, regarding the direction of the discontinuous variation of the spherical aberration, when observed from the smaller numerical aperture to the larger numerical aperture, the spherical aberration varies in the negative direction at the numerical aperture NAL, and in the positive direction at the numerical aperture NAH. Owing to this, the reproduction of the optical disk having the thin transparent substrate with the thickness t1 is made satisfactory, and at the same time, the reproduction of the optical disk having the thick transparent substrate with the thickness t2 can be carried out satisfactorily. In addition, because t2>t1 and NA1>NA2 in this embodiment, the spherical aberration varies discontinuously in the negative direction at the numerical aperture NAL and in the positive direction at the numerical aperture NAH as described in the above, but in the case where t2<t1 and NA1>NA2, the spherical aberration varies discontinuously in the positive direction at the numerical aperture NAL and in the negative direction at the numerical aperture NAH.

Further, in reproducing the second optical disk having the transparent substrate with the thickness t2, the S figure characteristic of the optical pickup device 10 is improved by making it positive the spherical aberration from the numerical aperture NAL to the numerical aperture NAH (the spherical aberration of the light flux passing through the second divided surface Sd2). In addition, because t2>t1 and NA1>NA2 in this embodiment, the spherical aberration from the numerical aperture NAL to the numerical aperture NAH is made to be positive, but in the case where t2<t1 and NA1>NA2, it is proper to make the spherical aberration negative.

Further, in the case of reproduction through the transparent substrate with the thickness t1 (refer to FIG. 14(a)), by making it less than $0.07\lambda_1$ rms or desirably $0.05\lambda_1$ rms. (where $\lambda_1$ is the wavelength of the light source) the wave front aberration by the light flux excluding the one passing through the surface from NAL to NAH out of the light flux with the numerical aperture NA1, that is, the light flux passing through the surfaces from the optical axis to NAL and from NAH to NA1, the reproduction of the first optical disk having the substrate with the thickness t1 is made satisfactory.

Further, if t1=0.6 mm, t2 1.2 mm, 610 nm<$\lambda_1$ 670 nm, 740 nm<$\lambda_1$<870 nm, and 0.40<NA2<0.51, it is desirable that the condition 0.60(NA2)<NAL<1.3(NA2) is satisfied (this lower limit 0.60(NA2) should desirably be 0.80(NA2), or more desirably 0.85(NA2) in practical use, and the upper limit should desirably be 1.1(NA2)). If NAL exceeds the lower limit, the side lobe becomes too large to make a precise reproduction of the information, and if NAL exceeds the upper limit, the light flux is limited too more in excess to produce the spot diameter of diffraction limit estimated at the wavelength $\lambda_2$ and the numerical aperture NA2. In addition, NAL referred to in the above indicates the NAL on the second divided surface Sd2 at the time when the second light source 112 is used.

Further, it is desirable that the condition 0.01<NAH−NAL<0.12 is satisfied (this upper limit 0.12 should desirably be 0.1 in practical use). If it exceeds this lower limit, the spot shape at the time of reproducing the second optical disk becomes worse, and the side lobe spot diameter becomes larger; if it exceeds the upper limit, the spot shape n at the time of reproducing the first optical disk is made disordered to bring about the decrease of the light quantity. In addition, NAL and NAH referred to in the above indicate the NAL and NAH on the second divided surface in the case where the second light source 112 is used.

Further, at the time of reproducing the second optical disk (at the time of reproduction through the transparent substrate with the thickness t2), it is desirable that the condition that the spherical aberration for the range from the numerical aperture NAL to the numerical aperture NAH is from $-2(\lambda_2)/(NA2)^2$ to $5(\lambda_2)/(NA2)^2$ is satisfied. Further, this condition should desirably be such that said spherical aberration is equal to or smaller than $3(\lambda_2)/(NA2)^2$ at the time of reproduction, and considering the recording (reproduction can also be made, of course), said aberration should desirably be larger than zero. If the aberration exceeds this lower limit, the spherical aberration is corrected in excess to make it worse the spot shape at the time of reproducing the first optical disk, and if it exceeds the upper limit, the spot shape at the time of reproducing the second optical disk is made worse, and the side lobe spot diameter becomes larger. In particular, it is more desirable that this condition is such that said aberration falls within the range from 0 to $2(\lambda_2)/(NA2)^2$, and if it is satisfied, the focus error signal can be satisfactorily obtained.

Further, to state it from another point of view, the above-described NAL and NAH are provided (that is, the divided surface utilized mainly for the reproduction of the second optical disk is provided) between the numerical aperture NA3 and the numerical aperture NA4 of the objective lens 1 at the optical disk side, which satisfy not only the condition that 0.60(NA2)<NA3<1.3(NA2) (this lower limit 0.60 (NA2) should desirably be 0.80(NA2), or more desirably 0.85(NA2) in practical use, and the upper limit should desirably be 1.1(NA2)) but also the condition that 0.01<NA4−NA3<0.12 (desirably 0.1). Owing to this, for the second optical disk, an optical disk requiring a larger numerical aperture can be reproduced, without lowering the intensity of the light spot converged on the first optical disk.

Further, it is desirable that the angle made by the normal line to the refracting surface S1 of the objective lens 1 and the optical axis varies by an amount from 0.05° to 0.5° between the circumferential positions of said refracting surface S1 corresponding to the two aperture positions in the neighborhood of the numerical aperture NA2 (NAL and NAH). If the difference exceeds this lower limit, the spot shape at the time of reproducing the second optical disk becomes worse, and the side lobe spot diameter becomes larger; if it exceeds the upper limit, the spherical aberration is corrected in excess, making the spot shape at the time of reproducing the first optical disk worse.

In particular, in the case where t2>t1 and NA1>NA2, as seen in the direction from the optical axis to the circumference, at the numerical aperture NAL, the point where the normal line to the refracting surface intersects the optical axis shifts discontinuously to the nearer direction to the refracting surface facing toward the light source, and at the numerical aperture NAH, the point where the normal line to the refracting surface intersects the optical axis shifts discontinuously to the farther direction from the refracting surface facing toward the light source. Owing to this, the reproduction of the optical disk having the thin transparent substrate with the thickness t1 is made satisfactory, and the reproduction of the optical disk having the thick transparent substrate with the thickness t2 can also be performed satisfactorily.

Figure 15:
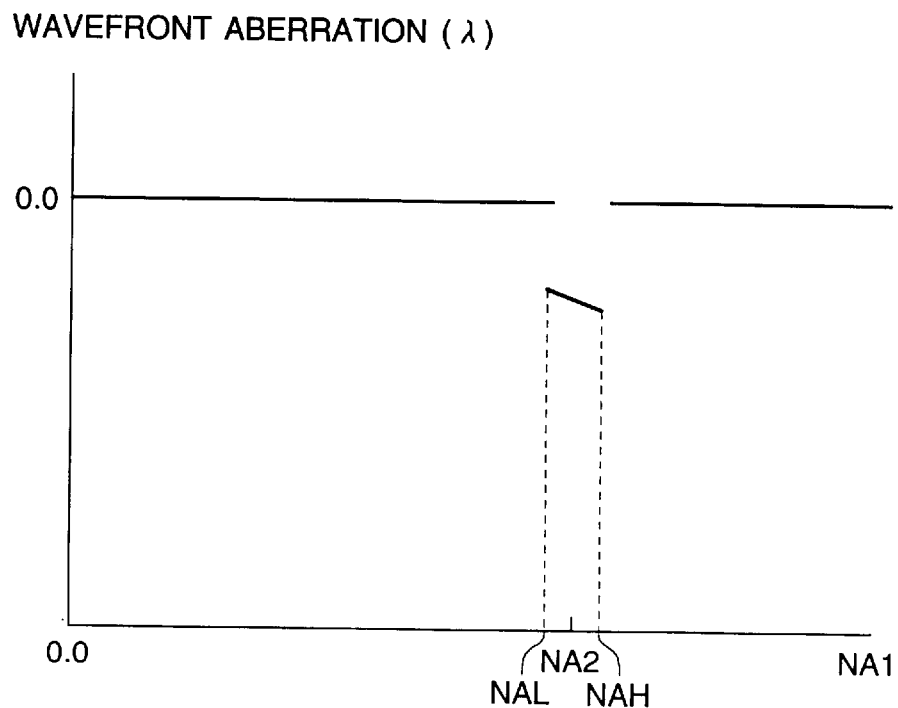
FIGS. 15(a) and 15(b) are diagrams showing wave front aberration curve.
Figure 15:
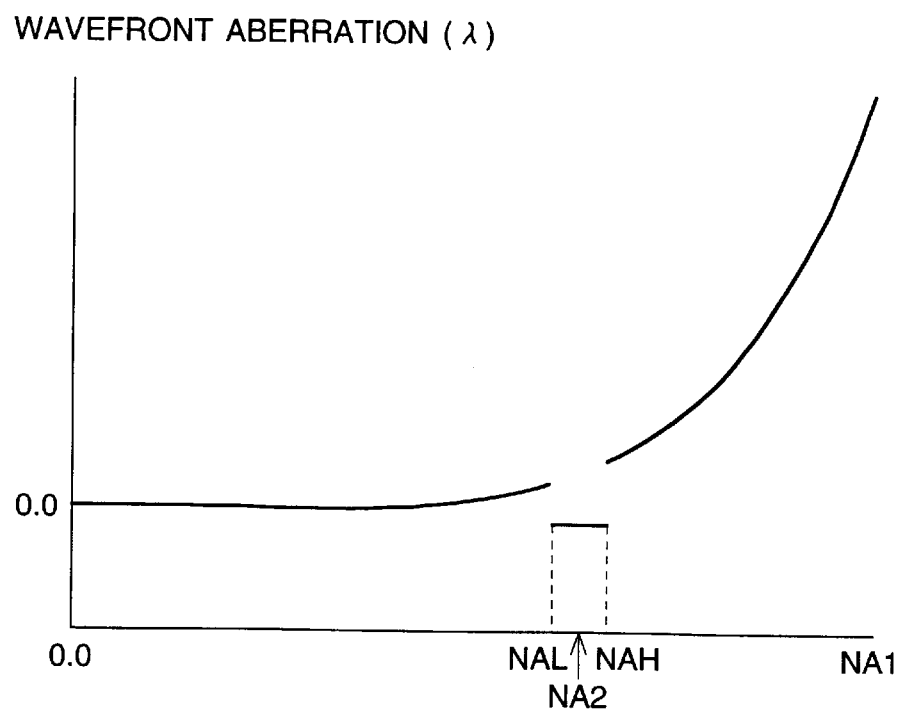

Further, the wave front aberration of the objective lens 1 of this embodiment is the one as shown in FIG. 15. FIG. 15 shows the wave front aberration curve with the wave front aberration ($\lambda$) taken for the ordinate and the numerical aperture taken for the abscissa; (a) shows the wave front aberration at the time when the transparent substrate of the first optical disk (thickness t1) is in the optical path, and (b) shows that at the time when the transparent substrate of the second optical disk (thickness t2) is in the optical path with a solid line respectively. In addition, this wave front aberration curve is obtained by measuring the wave front aberration using an interferometer or the like, on the condition that the wave front aberration becomes best when each of the transparent substrate is in the optical path.

As is understood from the drawing, regarding the objective lens 1 of this embodiment, the wave front aberration, as observed in the wave front aberration curves, becomes discontinuous at the two points in the neighborhood of the numerical aperture NA2 (namely, at NAL and NAH). Further, it is desirable that the maximum amount of discontinuity of the wave front aberration produced at the points where the curve is discontinuous, if it is expressed in the unit of length (mm), is equal to or smaller than $0.05(NA2)^2$ (mm), or if it is expressed in the unit of phase difference (rad), it is equal to or smaller than $2\pi(0.05(NA2)^2)/\lambda$(rad) (where $\lambda$ is the used wavelength in mm unit). If it becomes larger than this, the fluctuation of the wave front aberration with the fluctuation of the wavelength becomes too large to absorb the dispersion of the wavelength of the semiconductor laser. Further, the inclination of the wave front aberration curve in this discontinuous portion (between NAL and NAH) is different from the inclination of the straight line connecting the end points of the curves (a broken line in FIG. 15(a)) in both sides of the discontinuous portion (the end point nearest to NAL and the end point nearest to NAH).

Further, the invention should not be confined to the contents described in this embodiment, that is, that the divided surfaces Sd1–Sd3 are provided on the refracting surface S1 of the objective lens 1, that an objective lens of an infinite system is employed, that a step is provided on the divided surface, the number of the divided surfaces, the shape of the second divided surface, and so forth.

Further, in this embodiment, because the first light source 111 and the second light source 112 are used in approximately the same magnification, it is possible to use the single photo-detector 30 for making the structure simple; however, it is appropriate to provide two photo-detectors corresponding to the respective light sources 111 and 112, and further, the magnification may be different for each.

"Another Embodiment"

Figure 16:
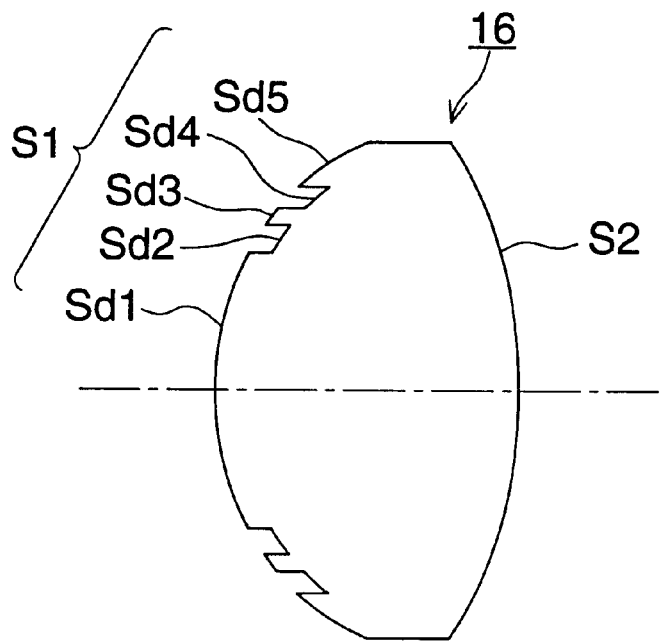
FIG. 16(a) is a cross-sectional view showing an objective lens schematically.
FIG. 16(b) is a front view of the objective lens viewing from a light source side.
Figure 16:
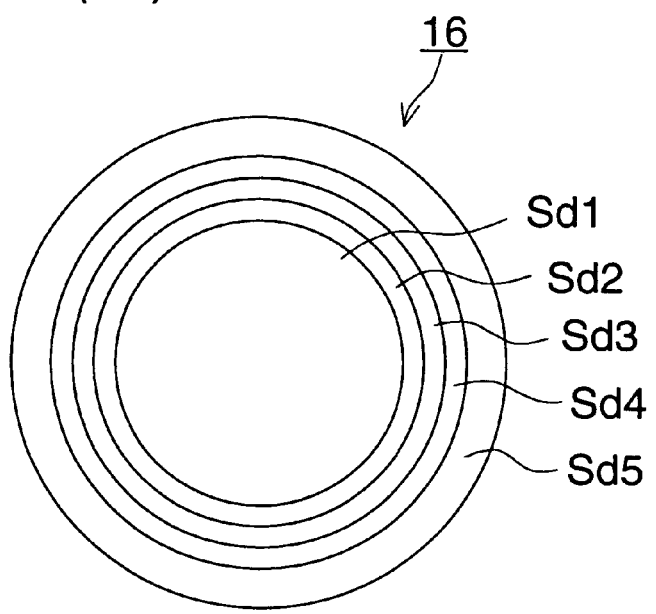

In the following, another embodiment will be explained with reference to FIG. 16 showing schematically the optical lens 1. FIG. 16(a) is a cross-sectional view of the objective lens 1, and FIG. 16(b) is a front view seen from the light source side. This embodiment is a modified example of the objective lens 1 for use in the optical pickup device noted in the embodiment described in the foregoing, and the objective lens 1 of this embodiment have its surface facing toward the light source divided into five divisional refracting surfaces, while the objective lens 1 noted in the above-described embodiment has its surface facing toward the light source divided into three divisional refracting surfaces. In addition, this embodiment is the one having five divided surfaces, and in other points the lens is the same as that of the embodiment described in the foregoing; hence, the explanation will be sometimes omitted.

In this embodiment, the objective lens 1 is a convex lens wherein the refracting surface facing toward the light source S1 and the refracting surface facing toward the optical disk both have a shape of an aspherical surface and a positive refracting power. Further, the refracting surface of the objective lens 1 facing toward the light source S1 is composed of five divided surfaces formed by concentric circles, namely, the first divided surface Sd1– fifth divided surface Sd5, that is, to state it generally, it is composed of, in the order of the direction to farther from the optical axis, the first divided surface Sd1 including the optical axis (in the neighborhood of the optical axis), the second divided surface, - - - , the (2n+1)th divided surface Sd(2n+1) (where n is a natural number, and n=2 in this embodiment). By providing a step, a difference in surface level, at each of the borders of the divided surfaces Sd1–Sd5, the respective divided surfaces Sd1–Sd5 are formed. This objective lens 1 has a structure such that the light flux passing through the first divided surface Sd1 including the optical axis (the first light flux) is utilized for the reproduction of the information recorded in the first optical disk and for the reproduction of the information recorded in the second optical disk, the light flux passing through the 2nth divided surface Sd2$n$ (in this embodiment, the second divided surface Sd2 and the fourth divided surface Sd4) are utilized mainly for the reproduction of the information recorded in the second optical disk, and the light flux passing through the (2n+1)th divided surfaces Sd(2n+1) (in this embodiment, the third divided surface Sd3 and the fifth divided surface Sd5) are utilized mainly for the reproduction of the information recorded in the first optical disk.

As mentioned in the above, in this embodiment, by increasing the number of the divided surfaces, the 2nth divided surfaces can be disposed at the positions of higher NA values; hence, not only the reproduction of the first optical disk requiring a high NA, but also the reproduction of, as the second optical disk, an optical disk requiring a higher NA in comparison with that in the embodiment described in the foregoing can be performed. On top that, the (2n–1)th divided surface (but the first divided surface is not concerned) can compensate for the lowering of the light quantity at the time of reproducing the first optical disk resulted from the 2nth divided surface being disposed at the positions of high NA; thus, not only the first optical disk but also the second optical disk can be reproduced satisfactorily.

To state it concretely, regarding the objective lens 1, first, the first aspherical surface of the first refracting surface S1 and the second refracting surface S2 (common refracting surface) are designed in such a manner as to make it equal to or less than $0.05\lambda_1$ rms the best wave front aberration of the light flux converged on the first optical disk having the transparent substrate with the thickness t1. Further, the second aspherical surface of the first refracting surface S1 is designed with the second refraction surface S2 (common refracting surface) left as it is in such a manner as to make the spherical aberration less than the spherical aberration produced when the light flux is converged on the second optical disk having the transparent substrate with the thickness t2 (t2≠t1) through the lens having this first aspherical surface. At this time, it is favorable to make the paraxial radius of curvature of the second aspherical surface and the paraxial radius of curvature of the first aspherical surface the same for the purpose of making a good reproduction of the second optical disk which is subjected to reproduction in the defocused state. The second aspherical surface is combined between the two positions NAL–NAH which is in the neighborhood of the numerical aperture NA2 of the first aspherical surface required for the reproduction of the second optical disk. The lens obtained in this way is the objective lens 1 of this embodiment.

Further, it is possible to make it larger the light quantity of the converged light flux at the time of reproducing the first optical disk, by utilizing the phase difference produced by combining the first divided surface and the second divided surface, with the second divided surface Sd2 and the fourth divided surface Sd4 a little shifted in the direction of the optical axis when they are combined. Besides, the second divided surface Sd2 and the fourth divided surface Sd4 are designed to be the same aspherical surface; however, it may be appropriate for these to use different aspherical surfaces to each other, and the amount of shifts of them may be different to each other.

In the above, it is desirable that the neighborhood of the required numerical aperture NA2 where the second aspherical surface is combined is between the numerical aperture NA3 and the numerical aperture Na4 of the objective lens 1 at the optical disk side, which satisfy not only the condition that 0.60(NA2)<1.3(NA2) (This lower limit 0.60(NA2) should desirably be 0.80(NA2) in practical use or more desirably 0.85(NA2), and this upper limit 1.3(NA2) should desirably be 1.1(NA2) in practical use; further, the upper limit 1.3(NA2) should be 1.1 in the case where the wavelength of the light source is 740 nm–870 nm when the second optical disk information recording medium is subjected to recording or reproduction.) but also the condition that 0.01<NA4−NA3<0.12 (This upper limit 0.12 should desirable be 0.1 in practical use.).

In this embodiment as described in the above, as in the embodiment described in the foregoing, when a DVD as the first optical disk having the transparent substrate with the thickness t1 of 0.6 mm is reproduced, the light flux passing through the first divided surface Sd1, the third divided surface Sd3, and the fifth divided surface Sd5 respectively converges on approximately the same positions, one of which is a first image forming position, and the wave front aberration (the wave front aberration when the light flux passing through the second divided surface Sd2 and the fourth divided surface Sd4 are excluded) is equal to or less smaller $0.05\lambda_1$ rms, where $\lambda_1$ is the wavelength of the light source.

At this time, the light flux passing through the second divided surface Sd2 and the fourth divided surface Sd4 respectively converges on the second image forming position which is different from the first image forming position. This second image forming position should be at a distance from $-40~\mu m$ to $-4~\mu m$ or desirably from $-27~\mu m$ to $-4~\mu m$ from the first image forming position, supposing that the first image forming position is at zero, the objective lens side of it is negative, and the reverse side is positive. Further, in this embodiment, because t1<t2 and NA1>NA2, the second image forming position should be at a distance from $-40~\mu m$ to $-4~\mu m$ or desirably from $-27~\mu m$ to $-4~\mu m$ from the first image forming position; however, in the case where t1>t2 and NA1>NA2, the second image forming position should be at a distance from $4~\mu m$ to $40~\mu m$ or desirably from $4~\mu m$ to $27~\mu m$ from the first image forming position. That is, the absolute value of the distance between the first optical position and the second optical position should fall within the range from $4~\mu m$ to $40~\mu m$ or desirably from $4~\mu m$ to $27~\mu m$.

Further, to consider this objective lens 1 from the view point of spherical aberration, it has a structure such that the spherical aberration varies discontinuously at four numerical aperture positions in the neighborhood of the numerical aperture NA2, so that a plurality of disks having the transparent substrate which is different in thickness to others may be reproduced by a single converging optical system. The spherical aberration varies discontinuously in this manner (the direction of varying is the same as that in the embodiment described in the foregoing), and if it is considered from the view point of wave front aberration, the wave front aberration becomes discontinuous at four positions in the neighborhood of the numerical aperture NA2, and the inclination of the wave front aberration curve in each of these discontinuous portions is different from the inclination of each of the straight lines connecting the end portions of the curves at the both sides of each of the discontinuous portions.

Regarding the objective lens 1 of this embodiment as described in the above, at the time of reproducing the second optical disk (at the time of reproduction through the transparent substrate with the thickness t2), it is desirable that the condition that the spherical aberration for the range from the numerical aperture NAL to the numerical aperture NAH is from $-2(\lambda)/(NA2)^2$ to $5(\lambda)/(NA2)^2$ is satisfied (where $\lambda$ in the above is the wavelength of the light source used in reproducing the second optical disk). Further, this condition should desirably be such that said spherical aberration is equal to or smaller than $3(\lambda)/(NA2)^2$ in the case of reproduction, and considering the case of recording (reproduction can also be made, of course), said aberration should desirably be larger than zero.

On the other hand, in this embodiment, with regard to the central position of the 2nth divided surface (the second divided surface Sd2 or the fourth divided surface sd4) in the direction perpendicular to the optical axis, the angle between the normal line to the 2nth divided surface and the optical axis should be larger than the angle between the normal line to the surface which is interpolated from the (2n–1)th divided surface (the first divided surface Sd1 or the third divided surface Sd3) and the (2n+1)th divided surface (the third divided surface Sd3 or the fifth divided surface Sd5) and the optical axis. Owing to this, it is possible to reproduce satisfactorily both of the first optical disk and the second optical disk. In addition, in this embodiment, because t2>t1 and NA1>NA2, the angle between the normal line to the 2nth divided surface and the optical axis should be larger than the angle between the normal line to the surface interpolated from the (2n–1)th divided surface and the (2n+1)th divided surface and the optical axis, but in the case where t2<t1 and NA1>NA2, it is proper to make it smaller.

Further, in this embodiment of the invention, it is desirable that the first divided surface Sd1–the (2n+1)th divided surface are determined in a manner such that, with regard to the approximately central position of the 2nth divided surface, namely the second divided surface Sd2 or the fourth divided surface Sd4, in the direction perpendicular to the optical axis, the difference between the angle made by the normal line to the 2nth divided surface and the optical axis and the angle made by the normal line to the surface interpolated from the (2n–1)th divided surface and the (2n+1)th divided surface (an aspherical surface obtained from fitting by least square method using the equation (1) of the aspherical surface) and the optical axis falls within the range from 0.02° to 1.0°.

Further, if this embodiment of the invention is grasped from another point of view as the embodiment described in the foregoing, in the objective lens I having a plurality of divided surfaces (five divided surfaces in this embodiment) formed by dividing at least one of its surfaces by concentric circles with regard to the optical axis, on the condition that the light which has passed through the (2n–1)th divided surface which is nearer to the optical axis than the 2nth divided surface (where n is a natural number equal to or larger than one), and the light which has passed through the (2n+1)th divided surface which is positioned at the reverse side of the 2nth divided surface against the optical axis are let to have approximately the same phase through the transparent substrate with the predetermined thickness (the first optical disk), and let the phase difference between the light which has passed through the (2n–1)th divided surface and the transparent substrate and the light which has passed through the portion of the 2nth divided surface (the second divided surface Sd2 or the fourth divided surface Sd4, for example) which is to the optical axis side of the approximately central position of the 2nth divided surface in the direction perpendicular to the optical axis be $(\Delta nL)\pi ((\Delta 1L)\pi$ or $(\Delta 2L)\pi$, for example) (rad), and the phase difference between the light which has passed through the (2n+1) divided surface and the transparent substrate and the light which has passed through the portion of the 2nth divided surface which is to the reverse side of the above-mentioned central position against the optical axis and the transparent substrate be $(\Delta nH)\pi ((\Delta 1H)\pi$ or $(\Delta 2H)\pi$, for example) (rad), then following inequality $(\Delta nH)>(\Delta nL)$ is established. In this case, as in the embodiment described in the foregoing, in the case where t1>t2 and NA1>NA2, the inequality $(\Delta nH)<(\Delta nL)$ should be established; accordingly $(\Delta nH)\neq(\Delta nL)$.

To state this from another point of view, the difference in surface level of the 2nth divided surface (the second divided surface Sd2 or the fourth divided surface Sd4, for example) from the (2n+1)th divided surface (the third divided surface sd3 or the fifth divided surface Sd5) is larger than the difference in surface level of the 2nth divided surface (the second divided surface Sd2 or the fourth divided surface Sd4, for example) from the (2n−1)th divided surface (the first divided surface sd1 or the third divided surface sd3, for example). In the same way as the above-described, also in this case, in the case where t1>t2 and NA1>NA2, the difference in surface level of the 2nth divided surface from the (2n+1)th divided surface is smaller than the difference in surface level of the 2nth divided surface from the (2n−1)th divided surface. Further, it is desirable that, the difference between the position of the surface interpolated from the (2n−1)th divided surface and the (2n+1)th divided surface (for example, the first divided surface and the third divided surface, or the third divided surface and the fifth divided surface) and the position of the 2nth divided surface taken at an arbitrary position from the optical axis varies asymmetrically with regard to the approximately central position of the 2nth divided surface. Furthermore, in this case, it is desirable that the difference becomes larger with the distance from the optical axis.

Besides, in this embodiment, the refracting surface S1 of the objective lens 1 is divided into five divisions, but the invention is not confined to this, and it may be appropriate to provide the divided surfaces on another optical element of the converging optical system (for example, such as a collimator lens), or it is possible to provide a separate optical element.

Further, in this embodiment, a step portion, that is, a difference in surface level is provided at each of the borders- of the first divided surface Sd1– the fifth divided surface Sd5; however, it is possible to form the divided surface with at least one of the borders formed continuously without providing the step. In other case, it is possible that the border between the divided surfaces are joined, for example, by a surface with a predetermined radius of curvature without bending the border surface. This curvature may be the one that is provided intentionally or unintentionally. An example of this unintentionally provided curvature is the curvature at the border formed in processing the metallic mold for forming the objective lens 1 with a plastic material etc.

Further, in this embodiment, on the refracting surface of the objective lens 1 facing toward the light source, each of the second divided surface Sd2 and the fourth divided surface Sd4 is provided in a ring shape formed by concentric circles with regard to the optical axis; however, the shape is not limited to a ring, but may be a broken ring. Further, the second divided surface Sd2 and/or the fourth divided surface Sd4 may be made up of a hologram or a Fresnel lens.

In addition, in the case where the second divided surface Sd2 is made up of a hologram, one of the light flux formed by dividing the original light flux into the zeroth order light and the first order light is utilized for the reproduction of the first optical disk and the other is utilized for the reproduction of the second optical disk. At this time, it is desirable that the light quantity of the light flux utilized for the second optical disk is larger than the light quantity of the light flux utilized for the reproduction of the first optical disk.

Further, in this embodiment, the reproduced signal from the second optical disk is made satisfactory by it that not only the condition that, when the first optical disk is reproduced (that is, when the light passes through the transparent substrate with the thickness t1), the best wave front aberration by the light flux passing through the first divided surface Sd1 and that passing through the third divided surface Sd3 is 0.07 $\lambda_1$ rms or desirably 0.05 $\lambda_1$ rms (where $\lambda_1$ (nm) is the wavelength of the light source used at the time of reproduc- ing the first optical disk), but also the condition that, when the second optical disk is reproduced (that is, when the light passes through the transparent substrate with the thickness t2), the best wave front aberration by the light flux passing through the first divided surface Sd1 is 0.07 $\lambda_2$ rms or desirably 0.05 $\lambda_2$ rms (where $\lambda_2$ (nm) is the wavelength of the light source used at the time of reproducing the second optical disk) is satisfied.

In the embodiments described in detail up to now, the first divided surface is designed as the one including the optical axis; however, because the very narrow surface domain around the optical axis does not affect the converging of light so much, it may be allowed that the very narrow surface domain around the optical axis as the above-mentioned that does not affect the converging of light practically is flat, projected, or concave. The essential point is that a divided surface to be utilized for the reproduction of the second optical disk is provided in the neighborhood of NA2 and the surface domain which is nearer to the optical axis than that (that is, the neighborhood of the optical axis) is made to be the first divided surface.

Further, in the explanation given up to now, only the reproduction of the information recorded in an optical disk has been explained; however, the recording of information in an optical disk is quite similar to this from the view point that the light spot converged by a converging optical system is important, and it is needless to say that the embodiments described in the above can be used effectively in recording.

Besides, according to the embodiments described in the above, the effect to improve the S-figure characteristic of the focus error signal can be obtained.

Figure 17:
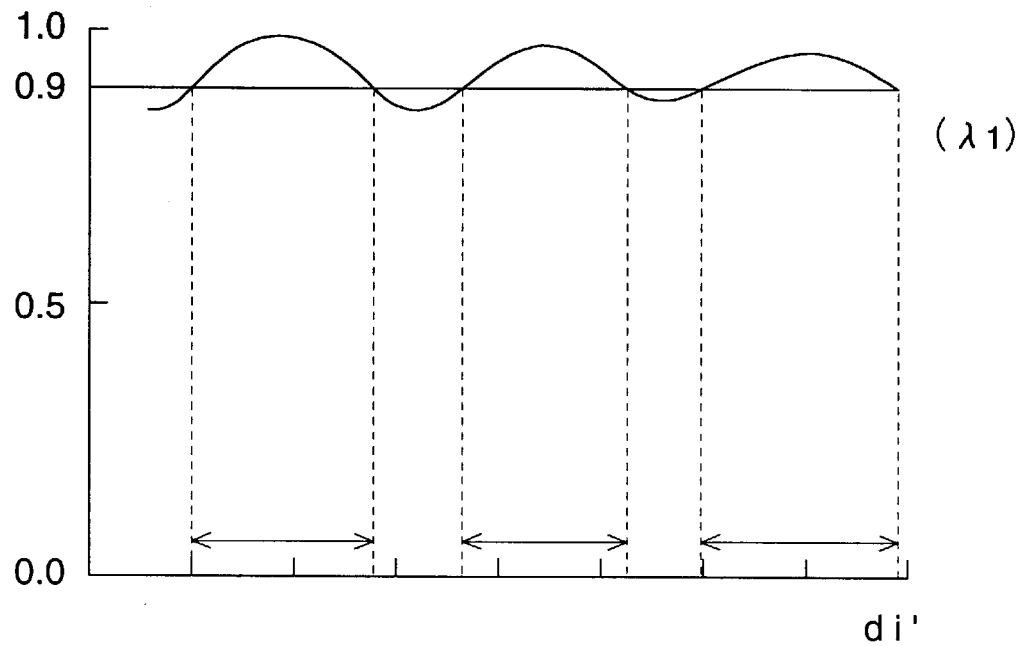
FIGS. 17(a) and 17(b) are diagrams showing a relatioship between a peak intensity ratio and a phase.
Figure 17:
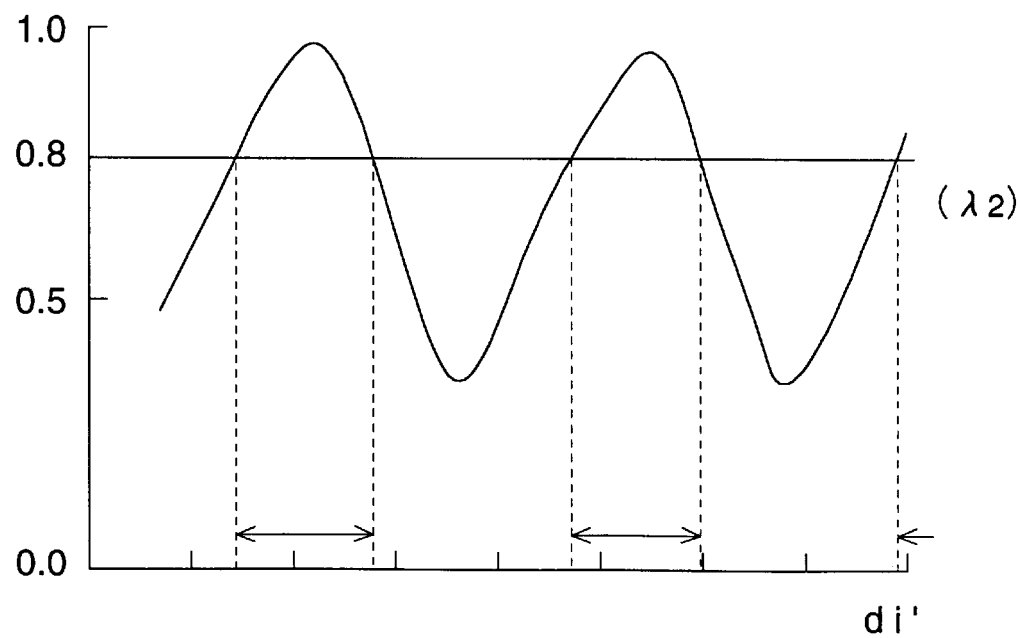

Next, by using FIG. 17, there will be explained about shifting of the phase of a light flux conducted for the purpose of increasing, as far as possible, light intensity of a spot formed on an information recording surface of an optical information recording medium. The following explanation can be applied to both of the embodiment of the lens having three divided surfaces and the embodiment of the lens having five divided surfaces.

FIG. 17(a) is a graph wherein a first optical information recording medium is read or recorded by the use of a first light source (wavelength is $\lambda 1$), and the axis of abscissas represents distance di' on the optical axis between an intersecting point between the second divided surface on the first aspherical surface of the objective lens extended to the optical axis in accordance with the expression of aspherical surface and the optical axis, and the second surface (the surface facing the first aspherical surface which can be either an aspherical surface or a spherical surface), while the axis of ordinates represents the peak intensity ratio of the beam spot. FIG. 17(b) is a graph wherein a second optical information recording medium is read or recorded by the use of a second light source (wavelength is $\lambda 2$), and the axis of abscissas represents distance di' on the optical axis between an intersecting point between the second divided surface of the objective lens extended to the optical axis in accordance with the expression of aspherical surface and the optical axis, and the second surface, while the axis of ordinates represents the peak intensity ratio of the spot.

A range of di' where the converged first light flux on the first information recording plane of the first optical information recording medium, namely, the peak intensity ratio of the spot on the first information recording plane is 0.9 or more is shown by arrow marks in FIG. 17(a). Further, a range of di' where the converged second light flux on the second information recording plane of the second optical information recording medium, namely, the peak intensity ratio of the spot on the second information recording plane is 0.8 or more is shown by arrow marks in FIG. 17(b).

By establishing di' to the value within a range of di' where the range of di' for the peak intensity ratio of not less than 0.9 in the graph of FIG. 17(a) and the range of di' for the peak intensity ratio of not less than 0.8 in the graph of FIG. 17(b) are overlapped, namely, within a range where arrow marks in both of FIGS. 17(a) and 17(b) overlap, it is possible to form the spot having the high intensity of light on the information recording plane for both of the first optical information recording medium and the second optical information recording medium. It is further possible to reduce the size (determined by the position where the intensity is $e^{-2}$ for the maximum central intensity) of a diameter of a light spot.

For the purpose of making the light intensity of the spot formed on an information recording plane of an optical information recording medium to be higher as far as possible, it is also possible to make the following expressions (1)–(6) to be satisfied.

$$W1-W2=m\lambda 1-\delta \quad (1)$$

$$|m|\leq 10 (m \text{ is an integer including } 0) \quad (2)$$

$$0\leq \delta <0.34\lambda 1 \quad (3)$$

$$W3-W4=m\lambda 2-\delta \quad (4)$$

$$|m|\leq 10 (m \text{ is an integer including } 0) \quad (5)$$

$$0\leq \delta <0.34\lambda 2 \quad (6)$$

W1 is an amount of wavefront aberration caused on the side where numerical aperture NA on the boundary section of the step of the wavefront aberration is greater, in the case of using the first light flux, and W2 is an amount of wavefront aberration caused on the side where numerical aperture NA on the boundary section of the step of the wavefront aberration is smaller, in the case of using the first light flux. The symbol λ1 is a wavelength of the first light flux. W3 is an amount of wavefront aberration caused on the side where numerical aperture NA on the boundary section of the step of the wavefront aberration is greater, in the case of using the second light flux, and W4 is an amount of wavefront aberration caused on the side where numerical aperture NA on the boundary section of the step of the wavefront aberration is smaller, in the case of using the second light flux. The symbol λ2 is a wavelength of the second light flux.

Incidentally, it is more preferable to satisfy the following expressions (3)' and (6)' in place of expressions (3) and (6).

$$0\leq \delta <0.25\lambda 1 \quad (3)'$$

$$0\leq \delta <0.25\lambda 2 \quad (6)'$$

It is also possible to satisfy the following expressions (3)" and (6)" in place of expressions (3) and (6).

$$0<\delta <0.34\lambda 1 \quad (3)"$$

$$0<\delta <0.34\lambda 2 \quad (6)"$$

Figure 18:
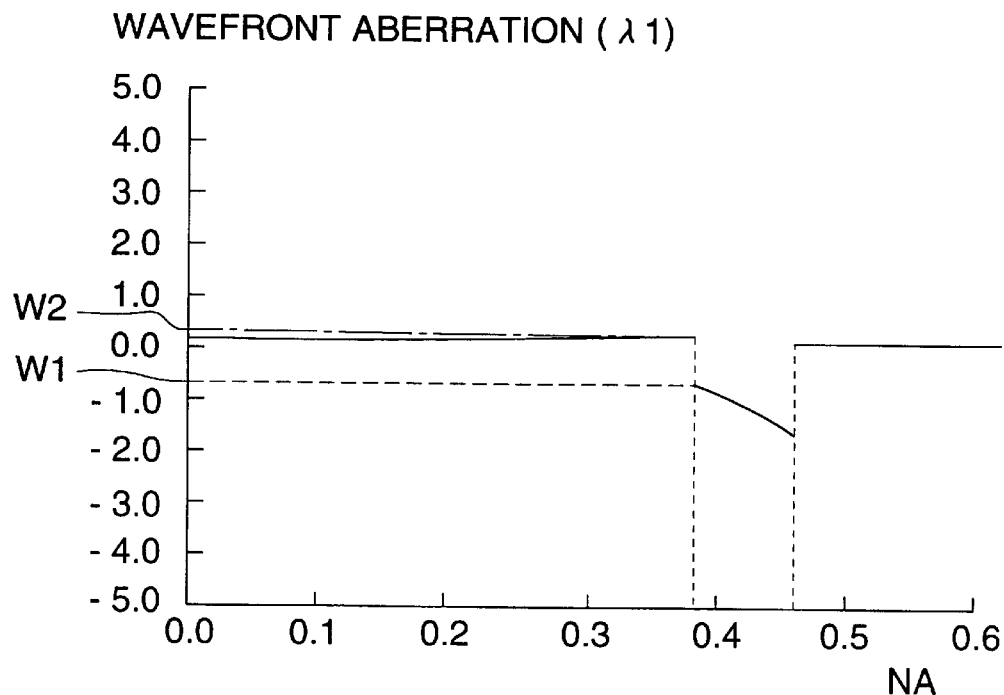
FIGS. 18(a) and 18(b) are diagrams showing wave front aberration curve.
Figure 18:
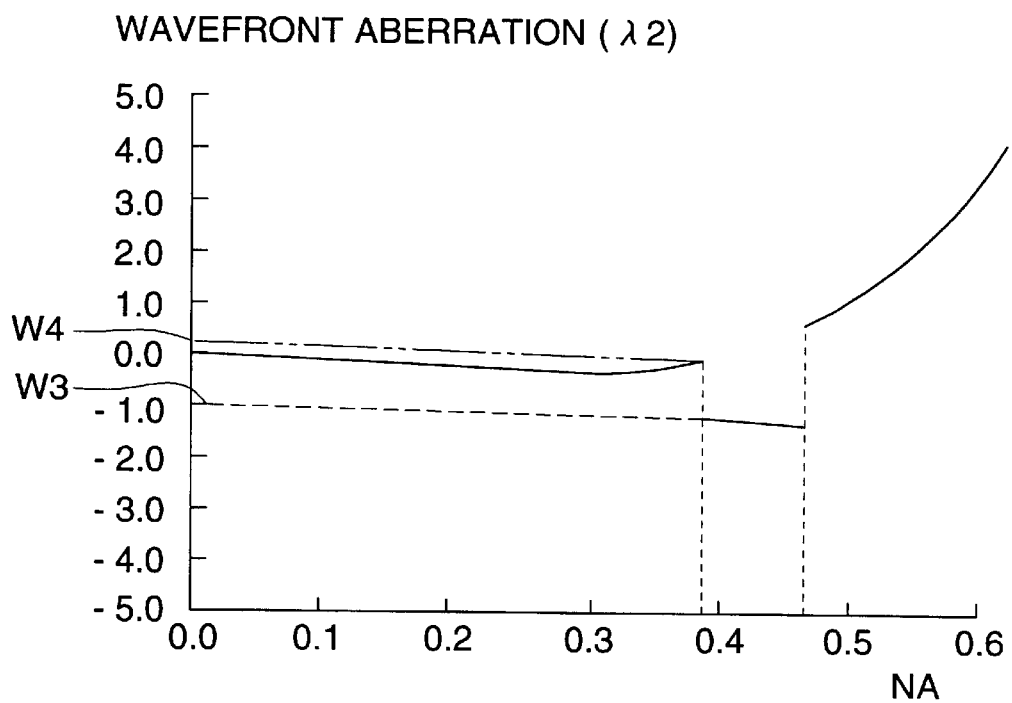

Incidentally, though it is preferable that W1, W2, W3 and W4 are values at the boundary section of the step of the wavefront aberration caused on the boundary between the first divided surface and the second divided surface, they may also be values at the boundary section of the step of the wavefront aberration caused on the boundary between the second divided surface and the third divided surface. FIGS. 18(a) and 18(b) represent wavefront aberration diagrams showing the occasions where W1, W2, W3 and W4 are values at the boundary section of the step of the wavefront aberration caused on the boundary between the first divided surface and the second divided surface.

Incidentally, it is more preferable that the aforesaid expressions (1)–(6) are satisfied for both of the occasion where values at the boundary section of the step of the wavefront aberration caused on the boundary between the first divided surface and the second divided surface are made to be W1, W2, W3 and W4 and the occasion where values at the boundary section of the step of the wavefront aberration caused on the boundary between the second divided surface and the third divided surface are made to be W1, W2, W3 and W4.

From the viewpoint of the lens, it is possible to use the following lenses.

An objective lens having an aspherical face for use in an optical pickup apparatus comprising,
   an optical surface having a first divided surface, a second divided surface, and a third divided surface, the second divided surface being farther from the optical axis than the first divided surface, and the third divided surface is farther from the optical axis than the second divided surface,
   wherein when the objective lens converges a first light flux which passes through the first divided surface and a third light flux which passes through the third divided surface on a first image forming position which agrees or mostly agrees in terms of position for both light fluxes,
   the objective lens converges a second light flux which passes through the second divided surface on a second image forming position which is away from the first image forming position by the distance of 4 ≠m to 40 ≠m and is closer to the objective lens than the first image forming position, and
   wherein a distance on the optical axis between an intersecting point of the second divided surface extended to the optical axis in accordance with the expression of aspherical surface and the optical axis is determined so that the peak intensity ratio of the converged first light flux on the first information recording plane of the first optical information recording medium may be 0.9 or more, and the peak intensity ratio of the converged second light flux on the second information recording plane of the second optical information recording medium may be 0.8 or more.

Or, the following lens may also be used.
An objective lens having an aspherical face for use in an optical pickup apparatus comprising,
   an optical surface having a first divided surface, a second divided surface, and a third divided surface, the second divided surface being farther from the optical axis than the first divided surface, and the third divided surface is farther from the optical axis than the second divided surface,
   wherein when the objective lens converges a first light flux which passes through the first divided surface and a third light flux which passes through the third divided surface on a first image forming position,
   the objective lens converges a second light flux which passes through the second divided surface on a second image forming position which is closer to the objective lens than the first image forming position, and wherein a distance on the optical axis between an intersecting point of the second divided surface extended to the optical axis in accordance with the expression of aspherical surface and the optical axis is determined so that the peak intensity ratio of the converged first light flux on the first information recording plane of the first optical information recording medium may be 0.9 or more, and the peak intensity ratio of the converged second light flux on the second information recording plane of the second optical information recording medium may be 0.8 or more.

It is naturally preferable that this objective lens satisfies the aforesaid expressions (1)–(8). Though it is preferable that the lens is a plastic lens, it is also possible to use a glass lens. It is also possible to provide an optical element other than an objective lens as a phase shifting means so that the aforesaid conditions may be attained.

As an optical information recording medium reproducing or recording apparatus, there are given DVD/CD player, DVD/CD/CD-R player, DVD/CD/CD-RW player, DVD/LD player, and DVD/DVD-RAM/CD/CD-R player. The invention is not naturally limited to these players. Further, each of these optical information recording medium reproducing or recording apparatuses has a power supply and a spindle motor in addition to the pickup apparatus.

(Second Embodiment)

Figure 5:
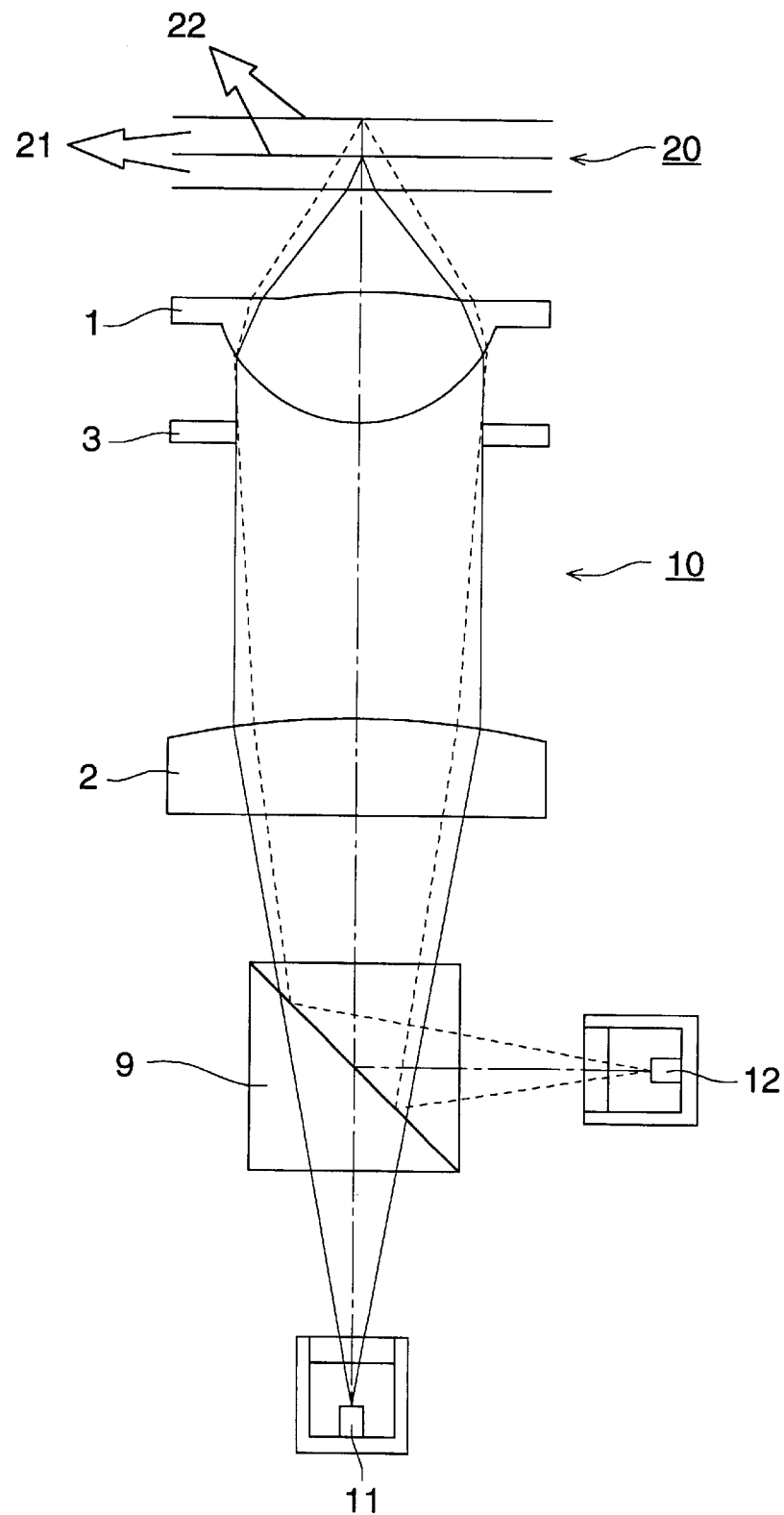
FIG. 5 is a schematic structure diagram of another embodiment of an optical pickup apparatus of the invention.

Next, the second embodiment will be explained as follows, referring to FIG. 5 which shows a schematic structure diagram of optical pickup apparatus 10. In the first embodiment, lateral magnification m1 of objective lens 1 itself in the case of using the first optical disk is the same as lateral magnification m2 of objective lens 1 itself in the case of using the second optical disk. However, in the present embodiment, m2 is greater than m1. Incidentally, when using functions and constituent elements which are the same as those in the first embodiment, the same symbols are given to them in the present embodiment, and explanation of them will be omitted because they are the same as those explained already, unless otherwise provided.

In the present embodiment, diverged light enters objective lens 1 through beam splitter 9 when using CD. Therefore, in the case of oblique incidence caused by tracking, an image height is still generated, although the central light enters to be in parallel with an optical axis. In this case, it is possible to correct coma in the case of having an image height of CD, by satisfying the following relationship;

$$0.06 \geq SC1/f1 \geq 0.002 \quad (1)$$

$$0.06 > SC2/f2 \geq 0 \quad (2)$$

wherein

SC1: a sine condition dissatisfaction amount of the objective lens at a thickness of t1 of a transparent substrate, f1: a focal length of the objective lens at a thickness of t1 of a transparent substrate, SC2: a sine condition dissatisfaction amount of the objective lens at a thickness of t2 of a transparent substrate, and f2: a focal length of the objective lens at a thickness of t2 of a transparent substrate.

Further, if collimated light is made to enter the objective lens (m1=0), an influence of coma in the case of using DVD caused by tracking of objective lens 1 can be lessened.

EXAMPLE

Examples of the invention will be explained as follows.

Example 1

The present example is that of the first embodiment stated above. As the first optical disk, DVD (thickness of transparent substrate t1=0.6 mm) is used, and recording or reproducing is conducted at wavelength of the first semiconductor laser λ1=650 nm, and as the second optical disk, CD (thickness of transparent substrate t2=1.2 mm) is used, and recording or reproducing is conducted at wavelength of the second semiconductor laser λ2=780 nm. Lens data are shown in Table 1 attached, and data of aspherical surface are shown in Table 2.

Incidentally, in the Table 1, there are shown surfaces up to an information recording surface of an optical disk by giving surface number i in the order of light advancement from a point of light emission of each of the first and second semiconductor lasers which is the surface number zero. However, the cover glass of the semiconductor laser is omitted. The symbol r represents a radius of curvature of the surface, d1 represents the distance between surfaces from i-th surface to (i+1)-th surface on the first semiconductor laser, d2 represents the distance between surfaces from i-th surface to (i+1)-th surface on the second semiconductor laser, n1 represents a refractive index at the wavelength of the first semiconductor laser, and n2 represents a refractive index at the wavelength of the second semiconductor laser.

It is assumed that an expression of the aspherical surface is based on the following expression.

$$X = \frac{H^2/r}{1 + \{1 - (1+\kappa)(H/r)^2\}^{0.5}} + \sum A_j H^{P_j}$$

expression, X represents an axis in the direction of an optical axis, H represents an axis which is perpendicular to the optical axis, and the direction of light advancement is positive. The symbol κ is a conical coefficient, Aj represents an aspherical surface coefficient, and Pj represents an exponent.

TABLE 1

| Surface number | r | d1 | n1 | d2 | n2 |
|---|---|---|---|---|---|
| 0 (Point of light emission) |  | 22 | 1.0 | 22 | 1.0 |
| 1 | 116.76 | 1.7 | 1.5377 | 1.7 | 1.5337 |
| 2 | −13.76 | 5 | 1.0 | 5 | 1.0 |
| 3 (Diaphragm) | ∞ | 0.0 | 1.0 | 0.0 | 1.0 |
| 4 | 2.113 | 2.2 | 1.5377 | 2.2 | 1.5337 |
| 5 | −7.927 | 1.76 | 1.0 | 1.39 | 1.0 |
| 6 (Disk) | ∞ | 0.6 | 1.58 | 1.2 | 1.55 |
| 7 | ∞ |  |  |  |  |

TABLE 2

| Second surface | κ = −0.73763 | | |
|---|---|---|---|
| Fourth surface | κ = −0.44397 | | First divided surface |
|  | A1 = −0.10017 × 10⁻² | P1 = 3.0 | (0 < H < 1.32 mm) |
|  | A2 = +0.30119 × 10⁻³ | P2 = 4.0 |  |
|  | A3 = +0.29708 × 10⁻³ | P3 = 5.0 |  |
|  | A4 = −0.17218 × 10⁻³ | P4 = 6.0 |  |
|  | A5 = +0.10181 × 10⁻³ | P5 = 7.0 |  |
|  | A6 = −0.15164 × 10⁻³ | P6 = 8.0 |  |
|  | A7 = +0.17759 × 10⁻⁴ | P7 = 10.0 |  |
|  | κ = −0.35133 | | Second divided surface |
|  | A1 = +0.15167 × 10⁻⁴ | P1 = 3.0 | (1.32 mm < H < 1.53 mm) |
|  | A2 = −0.13747 × 10⁻² | P2 = 4.0 |  |
|  | A3 = −0.11262 × 10⁻³ | P3 = 5.0 |  |

TABLE 2-continued

|   |   |   |   |
|---|---|---|---|
| | A4 = −0.13688 × 10⁻⁴ | P4 = 6.0 | |
| | A5 = +0.19371 × 10⁻³ | P5 = 7.0 | |
| | A6 = −0.21029 × 10⁻³ | P6 = 8.0 | |
| | A7 = +0.98041 × 10⁻⁵ | P7 = 10.0 | |
| | κ = −0.44397 | | Third divided surface |
| | A1 = −0.10017 × 10⁻² | P1 = 3.0 | (1.53 mm < H < 2.02 mm) |
| | A2 = +0.30119 × 10⁻³ | P2 = 4.0 | |
| | A3 = +0.29708 × 10⁻³ | P3 = 5.0 | |
| | A4 = −0.17218 × 10⁻³ | P4 = 6.0 | |
| | A5 = +0.10181 × 10⁻³ | P5 = 7.0 | |
| | A6 = −0.15164 × 10⁻³ | P6 = 8.0 | |
| | A7 = +0.17759 × 10⁻⁴ | P7 = 10.0 | |
| Fifth surface | κ = −0.39490 × 10⁻² | | |
| | A1 = −0.19328 × 10⁻² | P1 = 3.0 | |
| | A2 = +0.99739 × 10⁻² | P2 = 4.0 | |
| | A3 = +0.43080 × 10⁻² | P3 = 5.0 | |
| | A4 = −0.68470 × 10⁻² | P4 = 6.0 | |
| | A5 = +0.18059 × 10⁻³ | P5 = 7.0 | |
| | A6 = +0.13348 × 10⁻² | P6 = 8.0 | |
| | A7 = −0.12885 × 10⁻³ | P7 = 10.0 | |

On the surface of objective lens 1 closer to unit 13, there are provided first divided surface 6, second divided surface 7 and third divided surface 8 as shown in FIG. 2. As shown on the spherical aberration diagram in FIG. 3, a light flux passing through the first divided surface 6 and the third divided surface 8 contributes to spot forming on the recording surface, when recording or reproducing the first optical disk, and a light flux passing through the first divided surface 6 and the second divided surface 7 contributes to spot forming on the recording surface, when recording or reproducing the second optical disk.

Figure 3:
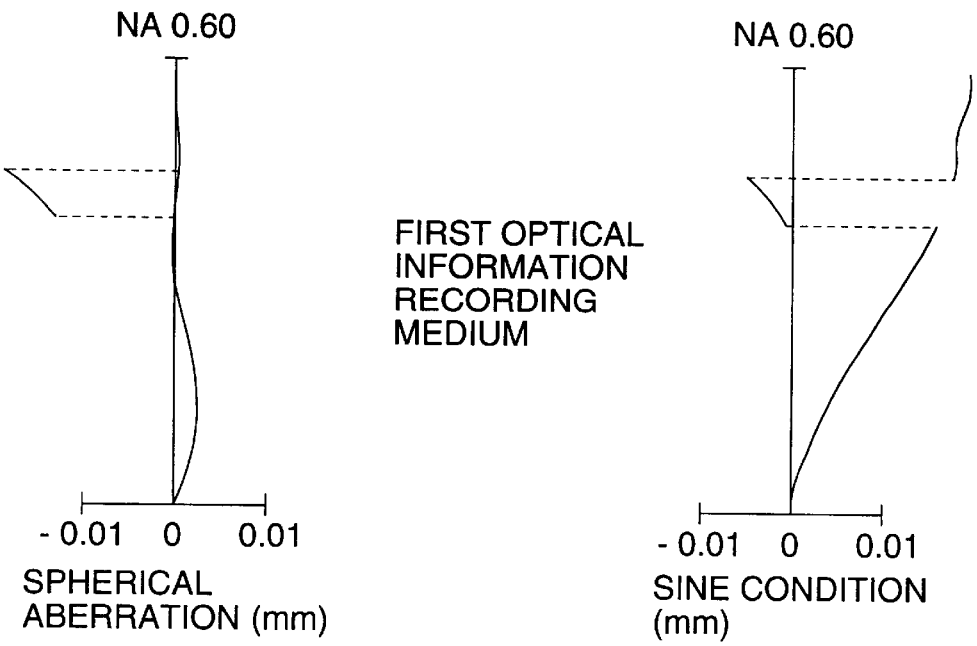
FIGS. 3(a) and 3(b) each includes an aberration diagram showing spherical aberration and sine condition in the first example of the objective lens stated above.
Figure 3:
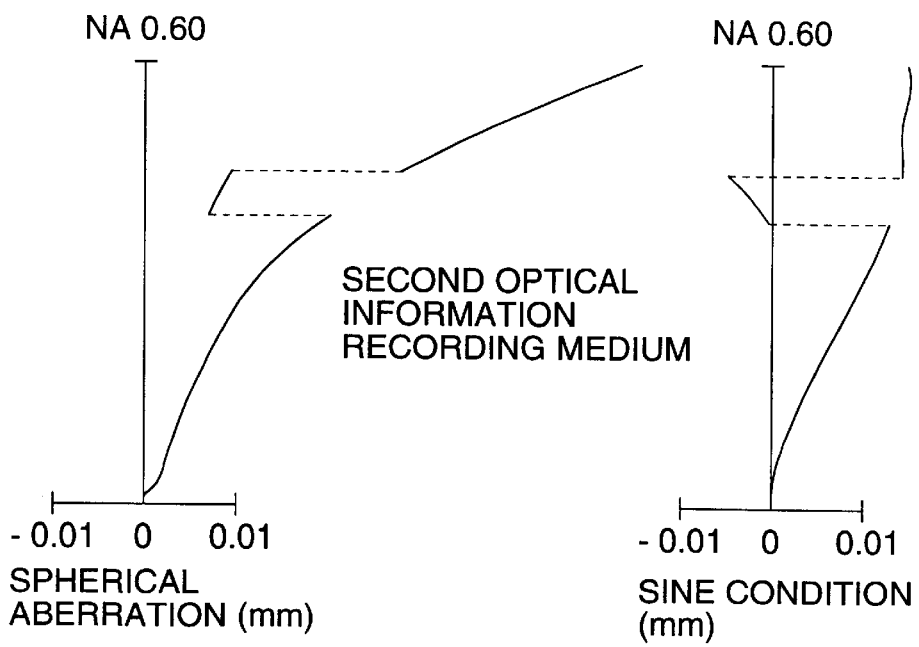

In this case, lateral magnification m1 of objective lens 1 in the case of a first optical disk is zero, lateral magnification m2 of objective lens 1 in the case of a second optical disk is zero, and focal length f1 of objective lens in the case of a first optical disk is 3.36 mm. Further, the sine condition dissatisfaction amount of the objective lens in the case of a first optical disk mostly satisfies SC1>0.01 mm for a light flux passing through first divided surface 6 and a light flux passing through the third divided surface as shown in FIG. 3.

Figure 4:
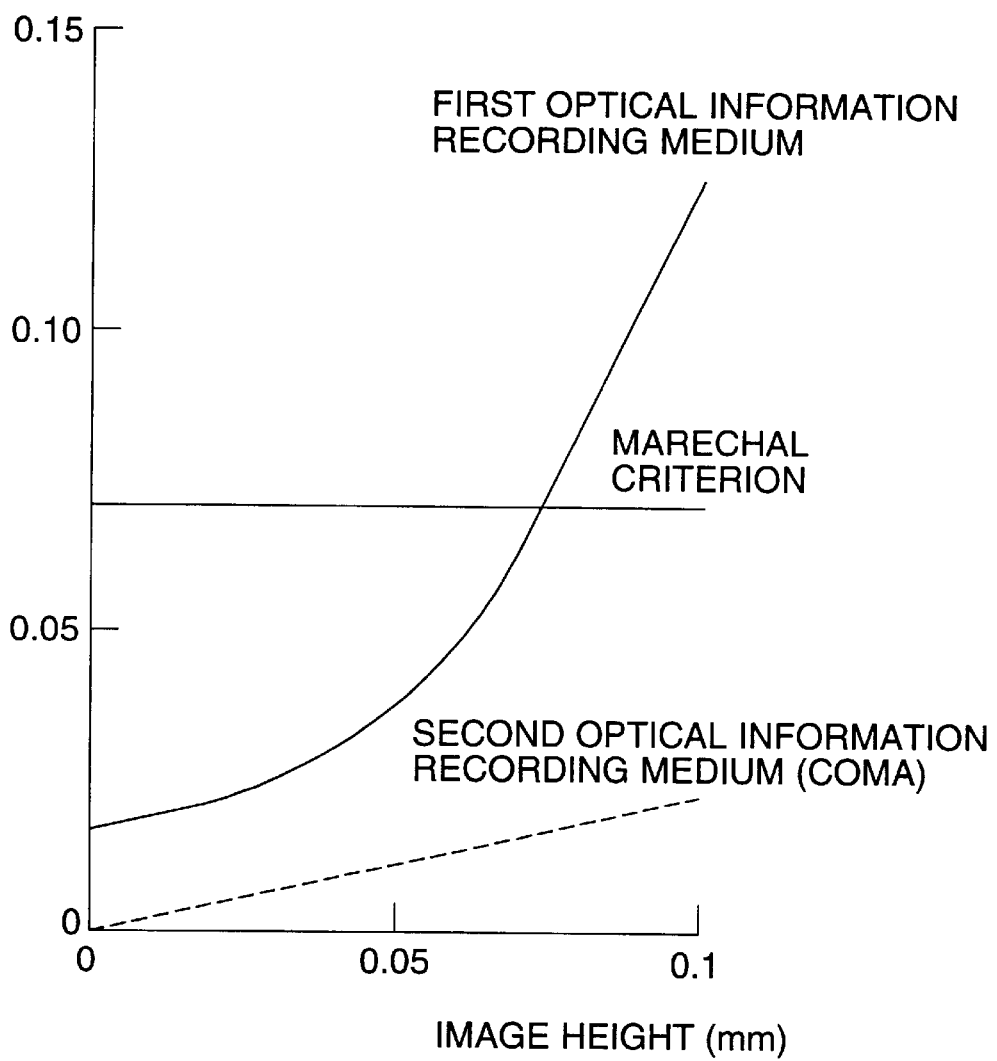
FIG. 4 is a wavefront aberration diagram for the objective lens stated above.

Namely, in the present example wherein $0.06 \geq SC1/f1 \geq 0.002$ is satisfied, the axial capacity in the case of the first optical disk can be compatible with the off-axis capacity of coma of the second optical disk as shown in FIG. 4. In FIG. 4, the wavefront aberration is shown in the form of relationship with an image height, and the wavefront aberration in the area lower than NA 0.60 of the objective lens is shown for the first optical information recording medium, and the wavefront aberration in the area lower than NA 0.45 of the objective lens is shown for the second optical information recording medium. This is the same as that in FIG. 7.

Example 2

The present example is an example of the second embodiment stated above. In the example, DVD (transparent substrate thickness t1=0.6 mm) is used as the first optical disk, and recording or reproducing is conducted at wavelength λ1 of the first semiconductor laser which is 650 nm, and CD (transparent substrate thickness t2=1.2 mm) is used as the second optical disk, and recording or reproducing is conducted at wavelength λ2 of the second semiconductor laser which is 780 nm. Table 3 shows lens data, and Table 4 shows data of an aspherical surface.

On the side of the objective lens 1 closer to collimator lens 2, there are provided first divided surface 6, second divided surface 7 and third divided surface 8 in the same way as in Example 1. As shown in the spherical aberration diagram in FIG. 6, when recording or reproducing the first optical disk, a light flux passing through the first divided surface 6 and the third divided surface 8 contributes to spot forming on the recording surface, while, when recording or reproducing the second optical disk, a light flux passing through the first divided surface 6 and the second divided surface 7 contributes to spot forming on the recording surface, In this case, lateral magnification m1 of the objective lens 1 in the case of the first optical disk is zero, lateral magnification m2 of the objective lens 1 in the case of the second optical disk is −1/34.6, and focal length f1 of the objective lens in the case of the first optical disk is 3.36 mm.

TABLE 3

| Surface number | r | d1 | n1 | d2 | n2 |
|---|---|---|---|---|---|
| 0 (Point of light emission) | | 16.7 | 1.0 | 13.3 | 1.0 |
| 1 | ∞ | 5 | 1.5141 | 5 | 1.5107 |
| 2 | ∞ | 2 | 1.0 | 2 | 1.0 |
| 3 | 116.76 | 1.7 | 1.5377 | 1.7 | 1.5337 |
| 4 | −13.76 | 5 | 1.0 | 5 | 1.0 |
| 5 (Diaphragm) | ∞ | 0.0 | 1.0 | 0.0 | 1.0 |
| 6 | 2.121 | 2.2 | 1.5377 | 2.2 | 1.5337 |
| 7 | −7.778 | 1.76 | 1.0 | 1.48 | 1.0 |
| 8 (Disk) | ∞ | 0.6 | 1.58 | 1.2 | 1.55 |
| 9 | ∞ | | | | |

TABLE 4

| | | | |
|---|---|---|---|
| Fourth surface | κ = −0.73763 | | |
| Sixth surface | κ = −0.38274 | | First divided surface |
| | A1 = −0.50643 × 10⁻³ | P1 = 3.0 | (0 < H < 1.31 mm) |
| | A2 = −0.90789 × 10⁻³ | P2 = 4.0 | |
| | A3 = −0.42888 × 10⁻⁴ | P3 = 5.0 | |
| | A4 = +0.96640 × 10⁻⁵ | P4 = 6.0 | |
| | A5 = +0.14868 × 10⁻³ | P5 = 7.0 | |
| | A6 = −0.18584 × 10⁻³ | P6 = 8.0 | |
| | A7 = +0.15007 × 10⁻⁴ | P7 = 10.0 | |
| | κ = −0.28054 | | Second divided surface |
| | A1 = −0.32246 × 10⁻² | P1 = 3.0 | (1.31 mm < H < 1.52 mm) |
| | A2 = +0.23511 × 10⁻² | P2 = 4.0 | |
| | A3 = −0.16701 × 10⁻² | P3 = 5.0 | |
| | A4 = −0.74980 × 10⁻³ | P4 = 6.0 | |
| | A5 = +0.24736 × 10⁻³ | P5 = 7.0 | |
| | A6 = +0.17070 × 10⁻⁴ | P6 = 8.0 | |
| | A7 = −0.23472 × 10⁻⁴ | P7 = 10.0 | |
| | κ = −0.38274 | | Third divided surface |
| | A1 = −0.50643 × 10⁻³ | P1 = 3.0 | (1.52 mm < H < 2.02 mm) |
| | A2 = −0.90789 × 10⁻³ | P2 = 4.0 | |
| | A3 = −0.42888 × 10⁻⁴ | P3 = 5.0 | |
| | A4 = +0.96640 × 10⁻⁵ | P4 = 6.0 | |
| | A5 = +0.14868 × 10⁻³ | P5 = 7.0 | |
| | A6 = −0.18584 × 10⁻³ | P6 = 8.0 | |
| | A7 = +0.15007 × 10⁻⁴ | P7 = 10.0 | |
| Seventh surface | κ = −0.17337 × 10⁻² | | |
| | A1 = +0.29810 × 10⁻⁴ | P1 = 3.0 | |
| | A2 = +0.11209 × 10⁻¹ | P2 = 4.0 | |
| | A3 = +0.54336 × 10⁻² | P3 = 5.0 | |
| | A4 = −0.67903 × 10⁻² | P4 = 6.0 | |
| | A5 = −0.39713 × 10⁻⁴ | P5 = 7.0 | |
| | A6 = +0.11923 × 10⁻² | P6 = 8.0 | |
| | A7 = −0.96232 × 10⁻⁴ | P7 = 10.0 | |

Figure 6:
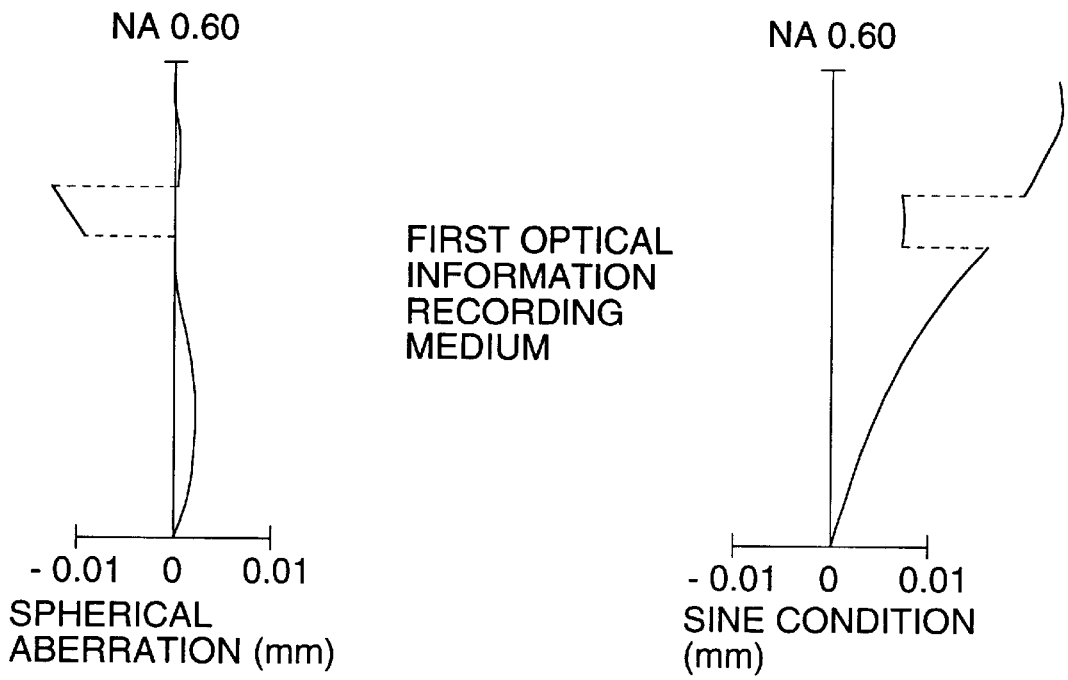
FIGS. 6(a) and 6(b) each includes an aberration diagram showing spherical aberration and sine condition in another example of the objective lens stated above.
Figure 6:
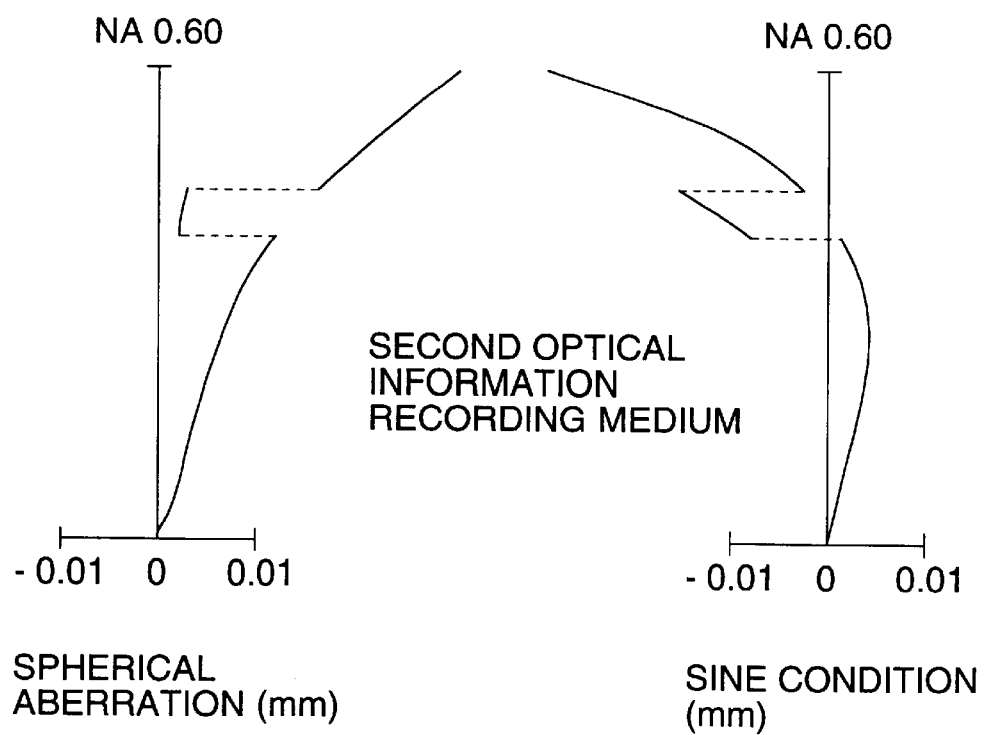

The sine condition dissatisfaction amount of the objective lens in the case of a first optical disk mostly satisfies SC1>0.01 mm for a light flux passing through first divided surface 6 and a light flux passing through the third divided surface as shown in FIG. 6. Further, focal length f2 of the objective lens in the case of the second optical disk is 3.38 mm, and with regard to the sine condition dissatisfaction amount, a part of the light flux passing through the first divided surface 6 satisfies SC2>0.003 as shown in FIG. 6.

Figure 7:
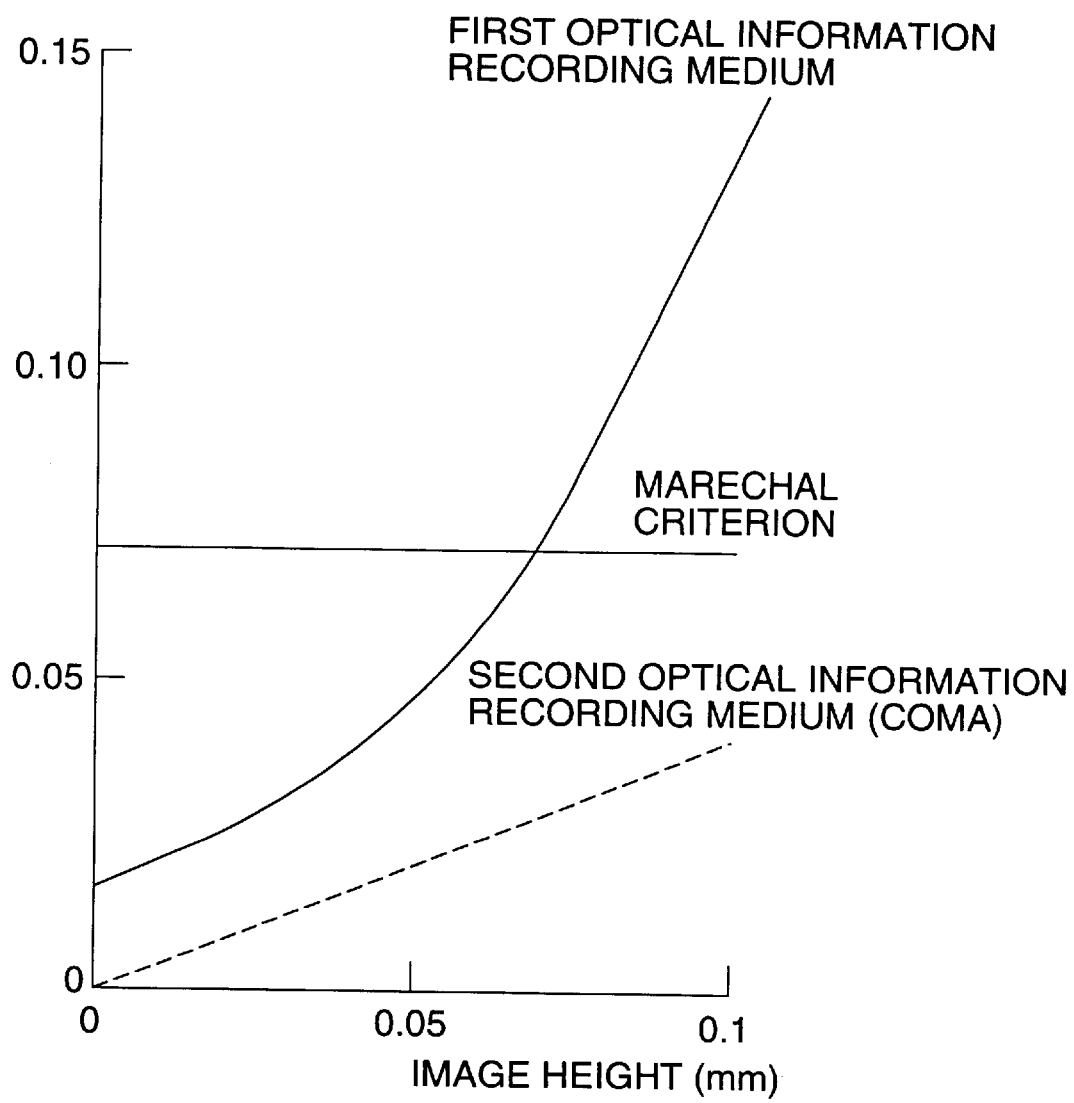
FIG. 7 is a wavefront aberration diagram of another example of the objective lens stated above.
Figure 8:
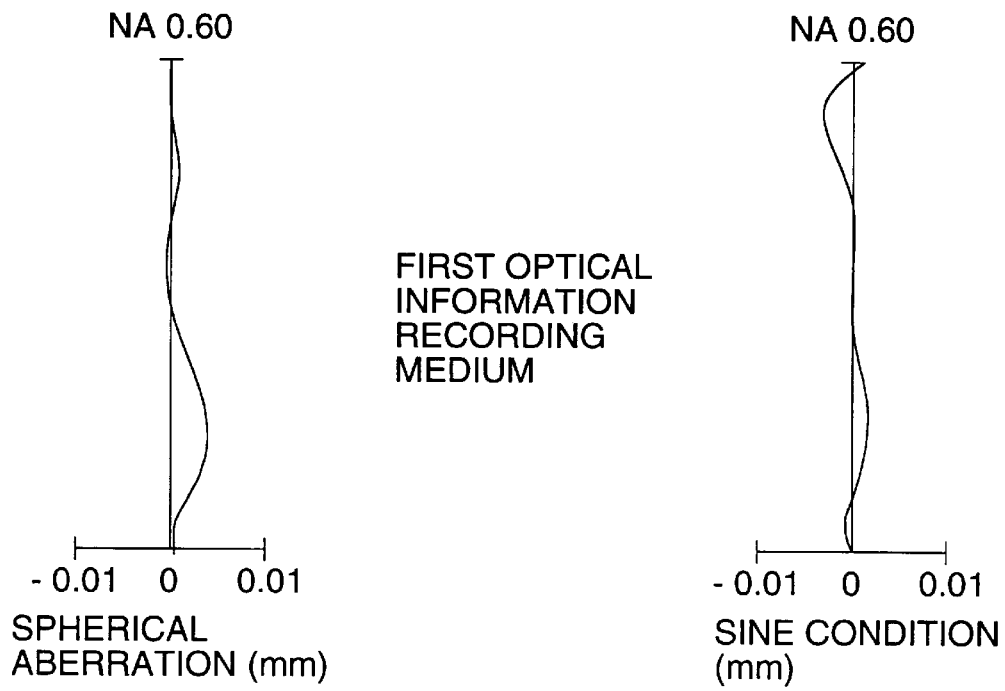
FIGS. 8(a) and 8(b) each includes an aberration diagram showing spherical aberration and sine condition in the conventional example of the objective lens for an optical pickup apparatus used under the condition of m1=m2.
Figure 8:
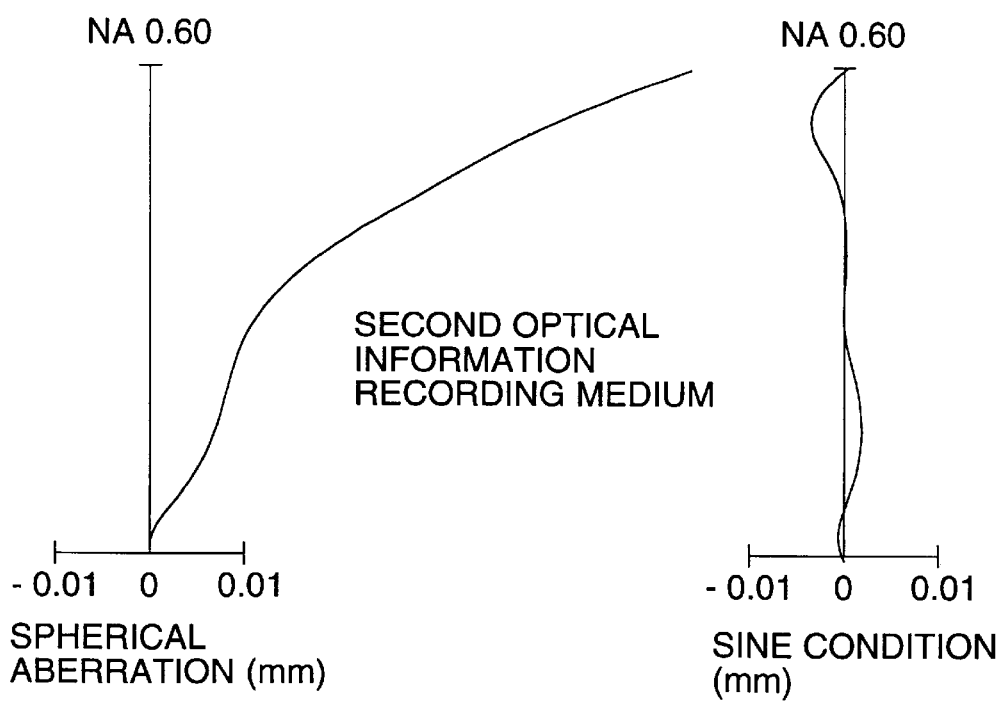
Figure 9:
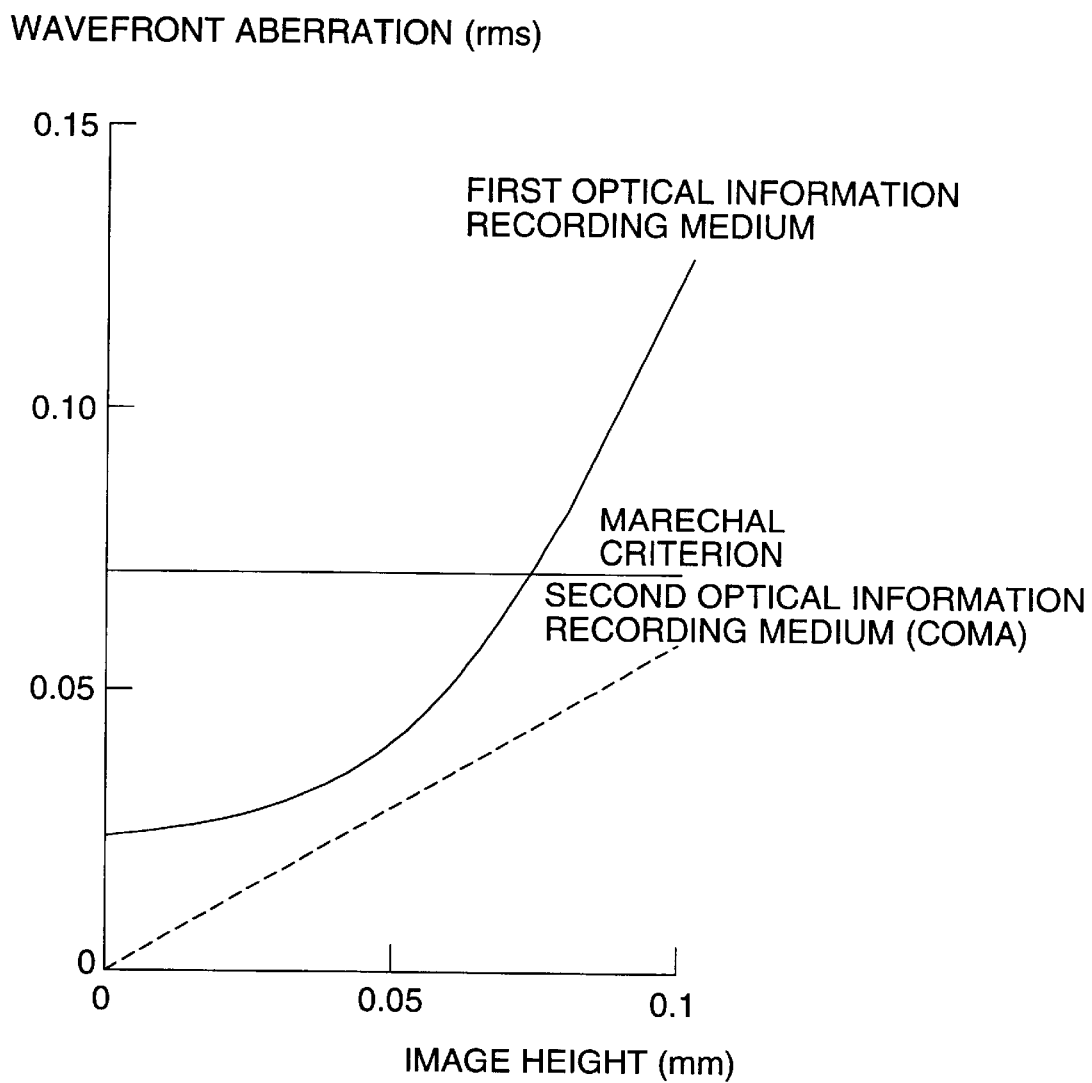
FIG. 9 is a wavefront aberration diagram in the conventional example for an optical pickup apparatus used under the condition of m1=m2.
Figure 10:
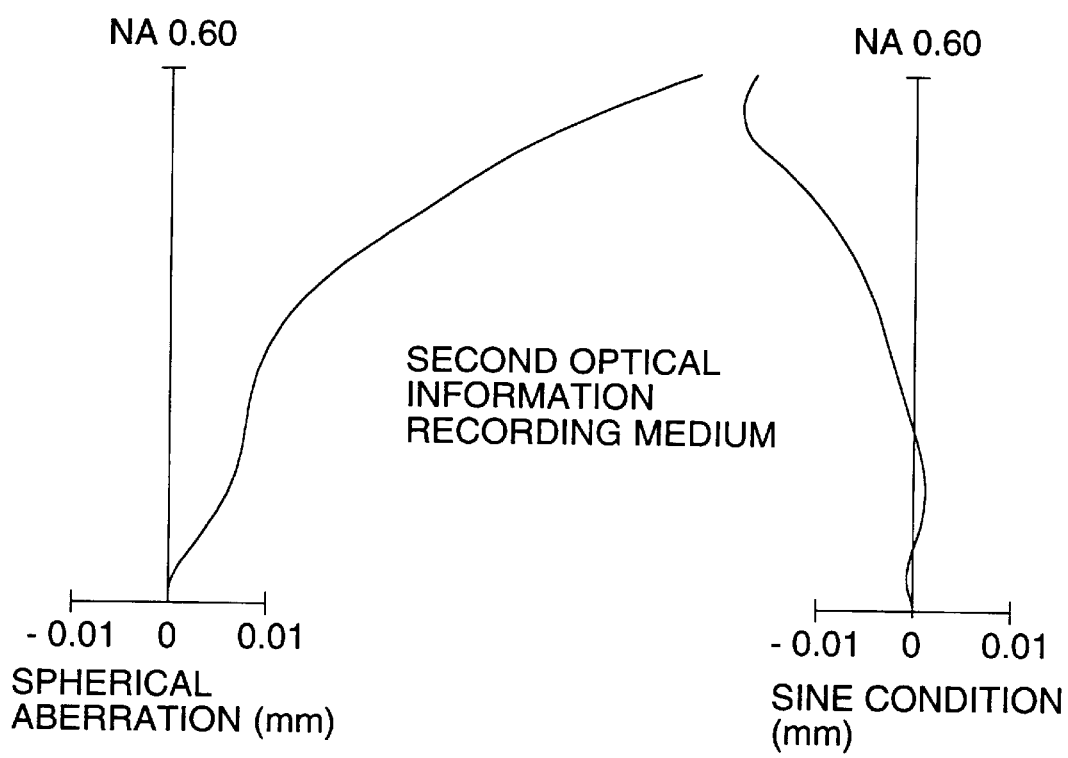
FIG. 10 is an aberration diagram showing spherical aberration and sine condition in the conventional example of the objective lens for an optical pickup apparatus used under the condition of m1>m2.
Figure 11:
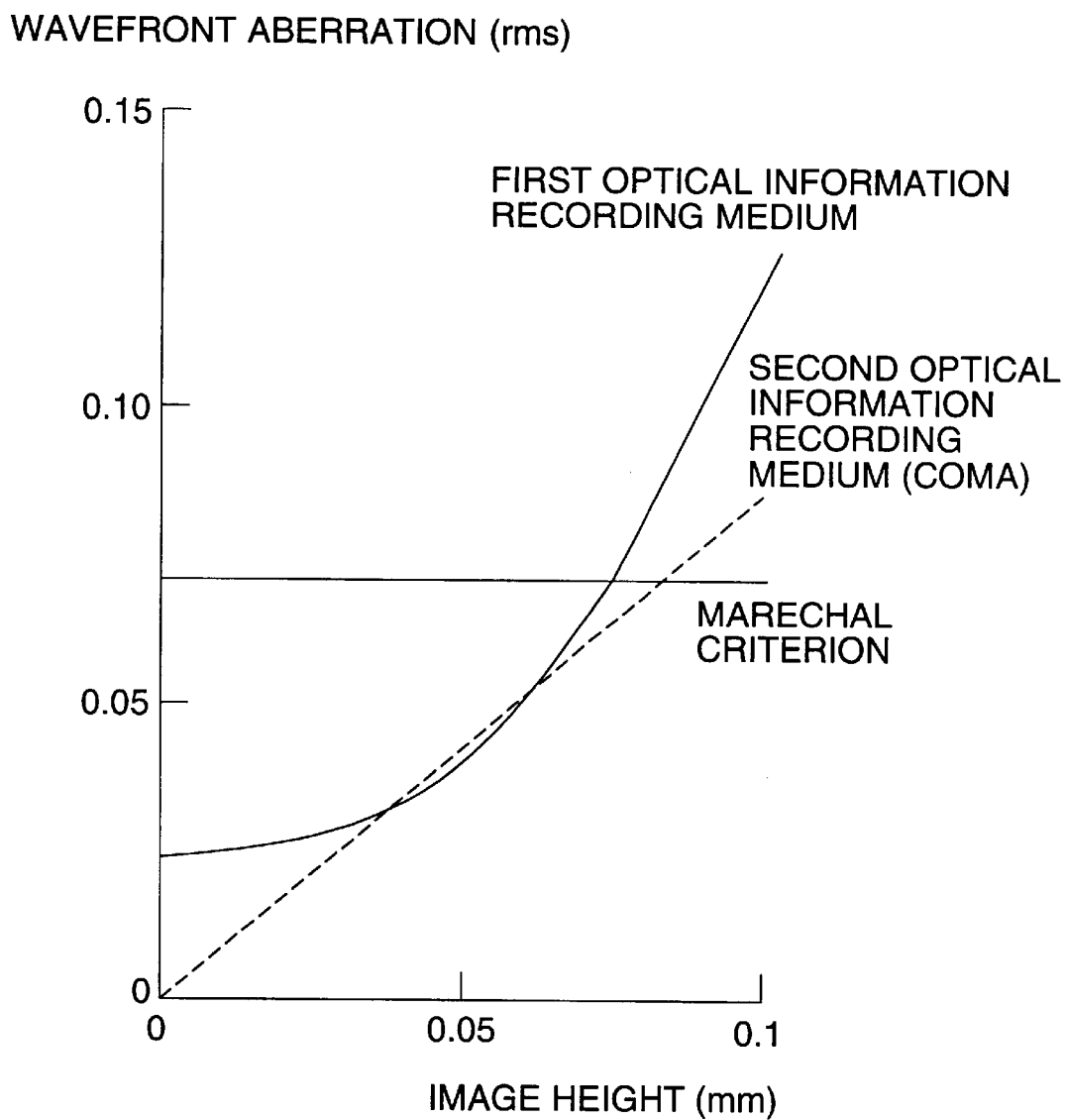
FIG. 11 is a wavefront aberration diagram in the conventional example of the objective lens for an optical pickup apparatus used under the condition of m1>m2.

Namely, in the present example wherein $0.06 \geq SC1/f1 \geq 0.002$ and $0.06 \geq SC2/f2 \geq 0$ are satisfied, the axial capacity in the case of the first optical disk can be compatible with the off-axis capacity of coma of the second optical disk as shown in FIG. 7.

Incidentally, the invention is not limited to the aforesaid example. Though it has been explained under the conditions of t1=0.6 mm and λ1=650 nm for DVD and t2=1.2 mm and λ2=780 nm for CD, this is to satisfy the spot size which is required by recording density of an optical information recording medium. From the viewpoint of this spot size, NA of the objective lens necessary for DVD is about 0.6, and that of the objective lens necessary for CD is about 0.45. In the invention, therefore, the sine condition dissatisfaction amount in the case of using DVD having high NA was considered as a standard. In the recent years, however, light sources each having a different wavelength such as a blue semiconductor laser and an SHG laser have been put to practical use, and it is estimated that a number of new optical information recording media may appear on the market in the future. In this case, the spot size is determined by recording density of the optical information recording medium, and λ1 is larger than λ2 when t1 is smaller than t2, and the structure of necessary numerical aperture of objective lens NA1<NA2 is also considered. In this structure, it is possible to design with a standard of the sine condition dissatisfaction amount for the second optical disk, and detailed explanation of the design of this kind will be omitted because it can be achieved easily from the foregoing.

In the optical pickup apparatus for recording or reproducing optical disks having transparent substrates each having a different thickness, the present invention makes it possible to provide an objective lens and an optical pickup apparatus wherein the axial capacity of the first optical disk can be compatible with the off-axis capacity for the second optical disk as is apparent from the comparison between an aberration diagram of the objective lens of the invention and that of the conventional example, as stated above. Disclosed embodiment can be varied by a skilled person without departing from the spirit of the invention.

What is claimed is:

1. An optical pickup apparatus for reproducing information from one of different kinds of optical information recording medium, each having a transparent substrate in different thickness, or for recording information onto one of said different kinds of optical information recording medium, comprising:
   a first light source for emitting first light flux whose wavelength is λ1;
   a second light source for emitting second light flux whose wavelength is λ2, wherein λ2 is greater than λ1;
   a converging optical system comprising an objective lens having an optical axis, a first portion, a second portion, and a third portion, the third portion being farther from the optical axis than the first portion, the second portion being provided between the first portion and the third portion, and
   a photo detector,
   wherein the first portion and the third portion are capable of converging the first light flux on a first information recording plane of a first optical information recording medium having a first transparent substrate of thickness t1 to reproduce information recorded in the first optical information recording medium or record information in the first optical information recording medium,
   wherein the first portion and the second portion are capable of converging the second light flux on a second information recording plane of a second optical information recording medium having a second transparent substrate of thickness t2 to reproduce information recorded in the second optical information recording medium or record information in the second optical information recording medium, wherein t2 is greater than t1,
   wherein the photo detector is capable of receiving light flux reflected from the first information recording plane or the second information recording plane, and
   wherein the following conditional formula is satisfied for an amount of the first light flux not less than 30% of the total amount of the first light flux passing the first portion:

$$0.06 \geq SC1/f1 \geq 0.002$$

where, in case that the first portion converges the first light flux on a first information recording plane, SC1 is a sine condition dissatisfaction amount of the first portion of the objective lens for a light flux at a height in the first light flux, and in case that the first portion converges the first light flux on a first information recording plane, f1 is a focal length of the first portion of the objective lens for a first light flux.

2. The optical pickup apparatus of claim 1, wherein, in case that the first portion and the third portion converge the first light flux on a first information recording plane, a lateral magnification of the objective lens is m1, and in case that the first portion and the second portion converge the second light flux on a second information recording plane, a lateral magnification of the objective lens is m2, the following conditional formula is satisfied:

$$m1=m2.$$

3. The optical pickup apparatus of claim 2, wherein the following formula is satisfied $$m1=0.$$

4. The optical pickup apparatus of claim 1, wherein the first light source and the second light source are arranged side by side on the same plane.

5. The optical pickup apparatus of claim 2, wherein the first light source and the second light source are made in a single unit.

6. The optical pickup apparatus of claim 1, wherein, in case that the first portion and the third portion converge the first light flux on a first information recording plane, a lateral magnification of the objective lens is m1, and in case that the first portion and the second portion converge the second light flux on a second information recording plane, a lateral magnification of the objective tens is m2, the following conditional formula is satisfied:

$$m1>m2.$$

7. The optical pickup apparatus of claim 6, wherein the following formula is satisfied for an amount of the second light flux not less than 30% of the total amount of the second light flux passing the first portion:

$$0.06 \geq SC2/f2 \geq 0.002$$

where, in case that the first portion converges the second light flux on a second information recording plane, SC2 is a sine condition dissatisfaction amount of the first portion of the objective lens for a second light flux being at a height in the second light flux, and in case that the first portion converges the second light flux on a second information recording plane, f2 is a focal length of the first portion of the objective lens for a second light flux.

8. The optical pickup apparatus of claim 6, wherein the following conditional formula is satisfied:

$$m1=0.$$

9. The optical pickup apparatus of claim 1, wherein the following conditional formula is satisfied:

$$NA1>NA2$$

where NA1 is a required numerical aperture of the objective lens at an image side thereof for recording or reproducing the first optical information recording medium, and NA2 is a required numerical aperture of the objective lens at an image side thereof for recording or reproducing the second optical information recording medium.

10. The optical pickup apparatus of claim 9, wherein the first light source is provided on the optical axis of the objective lens.

11. The optical pickup apparatus of claim 9, wherein the following conditional formulas are satisfied:

$$0.55 \text{ mm} < t1 < 0.65 \text{ mm}$$

$$1.1 \text{ mm} < t2 < 1.3 \text{ mm}$$

$$630 \text{ nm} < \lambda 1 < 670 \text{ nm}$$

$$760 \text{ nm} < \lambda 2 < 820 \text{ nm}$$

$$0.55 < NA1 < 0.65$$

$$0.40 < NA2 < 0.55.$$

12. The optical pickup apparatus of claim 1, wherein the second portion is in a shape of a ring representing a circle concentric with the optical axis.

13. The optical pickup apparatus of claim 1, wherein the objective lens comprises a step provided on a boundary between the first portion and the second portion or between the second portion and the third portion.

14. The optical pickup apparatus of claim 1, wherein the objective lens further comprises a fourth portion, and the fourth portion being farther from the optical axis than the third portion.

15. The optical pickup apparatus of claim 14, wherein the objective lens further comprises a fifth portion, and the fifth portion being farther from the optical axis than the fourth portion.

16. The optical pickup apparatus of claim 1, wherein the objective lens is made of plastic.

17. The optical pickup apparatus of claim 1, wherein the first portion and the third portion are capable of converging the first light flux on the first information recording plane so that wave front aberrations on the first information recording plane is not more than 0.07 $\lambda$1rms.

18. The optical pickup apparatus of claim 1, wherein the first portion and the second portion are capable of converging the second light flux on the second information recording plane, so that wave front aberrations on the second information recording plane is not more than 0.07 $\lambda$2rms.

19. A lens for use in an optical pickup apparatus for reproducing information from one of different kinds of optical information recording medium, each having a transparent substrate in different thickness, or for recording information onto one of said different kinds of optical information recording medium, the optical pickup apparatus having a first light source for emitting first light flux whose wavelength is $\lambda 1$, a second light source for emitting second light flux whose wavelength $\lambda 2$ is greater than $\lambda 1$, and a photo detector, the lens comprising:

an optical axis, a first portion, a second portion, and a third portion, wherein the third portion is farther from the optical axis than the first portion, and the second portion is provided between the first portion and the third portion, wherein the first portion and the third portion are capable of converging a first light flux of wavelength $\lambda 1$ from a first light source on a first information recording plane of a first optical information recording medium having a first transparent substrate of thickness t1 to reproduce information recorded in the first optical information recording medium or record information in the first optical information recording medium, wherein the first portion and the second portion are capable of converging a second light flux of wavelength $\lambda 2$ from a second light source on a second information recording plane of a second optical information recording medium having a second transparent substrate of thickness t2 to reproduce information recorded in the second optical information recording medium or record information in the second optical information recording medium, wherein $\lambda 2$ is greater than $\lambda 1$ and t2 is greater than t1, and wherein the following conditional formula is satisfied for an amount of the first light flux not less than 30% of the total amount of the first light flux passing the first portion:

$$0.06 \geq SC1/f1 \geq 0.002$$

where, in case that the first portion converges the first light flux on a first information recording plane, SC1 is a sine condition dissatisfaction amount of the first portion of the objective lens for a light flux at a height in the first light flux, and in case that the first portion converges the first light flux on a first information recording plane, f1 is a focal length of the first portion of the objective lens for a first light flux.

20. An optical information recording medium reproducing or recording apparatus for reproducing information from an optical information recording medium or for recording information onto the optical information recording medium, comprising:

an optical pickup apparatus comprising
a first light source for emitting first light flux whose wavelength is $\lambda 1$;
a second light source for emitting second light flux whose wavelength is $\lambda 2$, wherein $\lambda 2$ is greater than $\lambda 1$;
a converging optical system comprising an objective lens having an optical axis, a first portion, a second portion, and a third portion, the third portion being farther from the optical axis than the first portion, the second portion being provided between the first portion and the third portion, and
a photo detector, wherein the first portion and the third portion are capable of converging the first light flux on a first information recording plane of a first optical information recording medium having a first transparent substrate of thickness t1 to reproduce information recorded in the first optical information recording medium or record information in the first optical information recording medium, wherein the first portion and the second portion are capable of converging the second light flux on a second information recording plane of a second optical information recording medium having a second transparent substrate of thickness t2 to reproduce information recorded in the second optical information recording medium or record information in the second optical information recording medium, wherein t2 is greater than t1, wherein the photo detector is capable of receiving light flux reflected from the first information recording plane or the second information recording plane, and wherein the following conditional formula is satisfied for an amount of the first light flux not less than 30% of the total amount of the first light flux passing the first portion:

$$0.06 \geq SC1/f1 \geq 0.002$$

where, in case that the first portion converges the first light flux on a first information recording plane, SC1 is a sine condition dissatisfaction amount of the first portion of the objective lens for a light flux at a height in the first light flux, and in case that the first portion converges the first light flux on a first information recording plane, f1 is a focal length of the first portion of the objective lens for a first light flux.

21. A method of reproducing information from one of different kinds of optical information recording medium or of recording information onto one of different kinds of optical information recording medium by an optical pickup apparatus comprising a first light source, a second light source, a photo detector and a converging optical system having an optical axis, a first portion, a second portion and a third portion, the third portion being farther from the optical axis than the first portion, the second portion being provided between the first portion and the second portion, the method comprising steps of:

emitting a first light flux from the first light source or a second light flux from the second light source, wherein a Wavelength of the second light flux $\lambda 2$ is greater than a wavelength of the first light flux $\lambda 1$;

converging the first light flux by the converging optical system on a first information recording plane of a first optical information recording medium or the second light flux by the converging optical system on a second information recording plane of a second optical information recording medium; receiving light flux reflected from the optical information recording medium by the photo detector;

wherein, when reproducing information recorded in a first optical information recording medium having a first transparent substrate of thickness t1, a first light flux which passes through the first portion and a third light flux which passes through the third portion converge on a first information recording plane of the first optical information recording medium through the first transparent substrate to reproduce information recorded in the first optical information recording medium or record information in the first optical information recording medium, and, wherein, when reproducing information recorded in a second optical information recording medium having a second transparent substrate of thickness t2, greater than t1, the first light flux and a second light flux which pass through the second portion to converge on a second information recording plane of the second optical information recording medium through the second transparent substrate to reproduce information recorded in the second optical information recording medium or record information in the second optical information recording medium, wherein the following conditional formula is satisfied for an amount of the first light flux not less than 30% of the total amount of the first light flux passing the first portion:

$$0.06 \geq SC1/f1 \geq 0.002$$

where, in case that the first portion converges the first light flux on a first information recording plane, SC1 is a sine condition dissatisfaction amount of the first portion of the objective lens for a light flux at a height in the first light flux, and in case that the first portion converges the first light flux on a first information recording plane, f1 is a focal length of the first portion of the objective lens for a first light flux.

* * * * *